US012261000B2

United States Patent
Saijo

(10) Patent No.: US 12,261,000 B2
(45) Date of Patent: Mar. 25, 2025

(54) INPUT DEVICE

(71) Applicant: ALPS ALPINE CO., LTD., Tokyo (JP)

(72) Inventor: Takayuki Saijo, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 159 days.

(21) Appl. No.: 18/307,383

(22) Filed: Apr. 26, 2023

(65) Prior Publication Data
US 2023/0260721 A1 Aug. 17, 2023

Related U.S. Application Data

(63) Continuation of application No. PCT/JP2021/040339, filed on Nov. 2, 2021.

(30) Foreign Application Priority Data

Dec. 21, 2020 (JP) .................................. 2020-211595

(51) Int. Cl.
*H01H 13/14* (2006.01)
*G05G 5/03* (2008.04)
(Continued)

(52) U.S. Cl.
CPC ............... *H01H 13/14* (2013.01); *G05G 5/03* (2013.01); *G06F 3/016* (2013.01); *G06F 3/0362* (2013.01);
(Continued)

(58) Field of Classification Search
CPC ....... H01H 2205/004; H01H 2223/034; H01H 2223/0345; H01H 2223/036;
(Continued)

(56) References Cited

U.S. PATENT DOCUMENTS 6,737,592 B1 * 5/2004 Hoang ................. H01H 23/003
200/1 B
7,294,801 B2 * 11/2007 Shimizu ................. H01H 23/06
200/302.1
(Continued)

FOREIGN PATENT DOCUMENTS

JP 2013-212819 10/2013
JP 2015-109212 6/2015
(Continued)

OTHER PUBLICATIONS

International Search Report for PCT/JP2021/040339 mailed on Dec. 7, 2021.

*Primary Examiner* — Anthony R Jimenez
(74) *Attorney, Agent, or Firm* — IPUSA, PLLC

(57) ABSTRACT

An input device includes a base, an operation panel, and a shaft portion. The input device includes a first operation knob having a first operation part to swing the panel in a first swing direction and a second operation part to swing the panel in a second swing direction, the second operation knob having a third operation part to swing the panel in the second swing direction and a fourth operation part to swing the operation panel in the first swing direction. The input device includes a control unit to discriminate between a pressing operation and a pulling-up operation based on based on output of each of a swing detector, a first capacitance detection electrode, and a second capacitance detection electrode.

10 Claims, 12 Drawing Sheets

(51) Int. Cl.
  *G06F 3/01* (2006.01)
  *G06F 3/0362* (2013.01)
  *H01H 19/14* (2006.01)
(52) U.S. Cl.
  CPC ........ *H01H 19/14* (2013.01); *E05Y 2400/854* (2013.01); *E05Y 2900/55* (2013.01)
(58) Field of Classification Search
  CPC ....... H01H 2223/054; H01H 2223/056; H01H 2231/026; H01H 23/00; H01H 23/04; H01H 23/16; H01H 23/24; H01H 2003/02; H01H 2003/12; H01H 2013/00; H01H 2071/048; H01H 3/00; H01H 3/02; H01H 3/04; H01H 9/02; H01H 21/00; H01H 21/02; H01H 21/04; H01H 21/22; H01H 13/14; H01H 13/70; H01H 13/702; H01H 13/705; H01H 19/00; H01H 19/14; H01H 19/02; H01H 19/10; H01H 19/36; E05Y 2400/854; E05Y 2900/55; G06F 3/016; G06F 3/0362; G06F 3/01; G05G 5/00; G05G 5/03
  USPC .......................................................... 200/341
  See application file for complete search history.

(56) References Cited

U.S. PATENT DOCUMENTS

2020/0105482 A1    4/2020   Kosugi et al.
2021/0391129 A1    12/2021   Ito et al.

FOREIGN PATENT DOCUMENTS

JP    2017-126505    7/2017
JP    2020-126711    8/2020

* cited by examiner

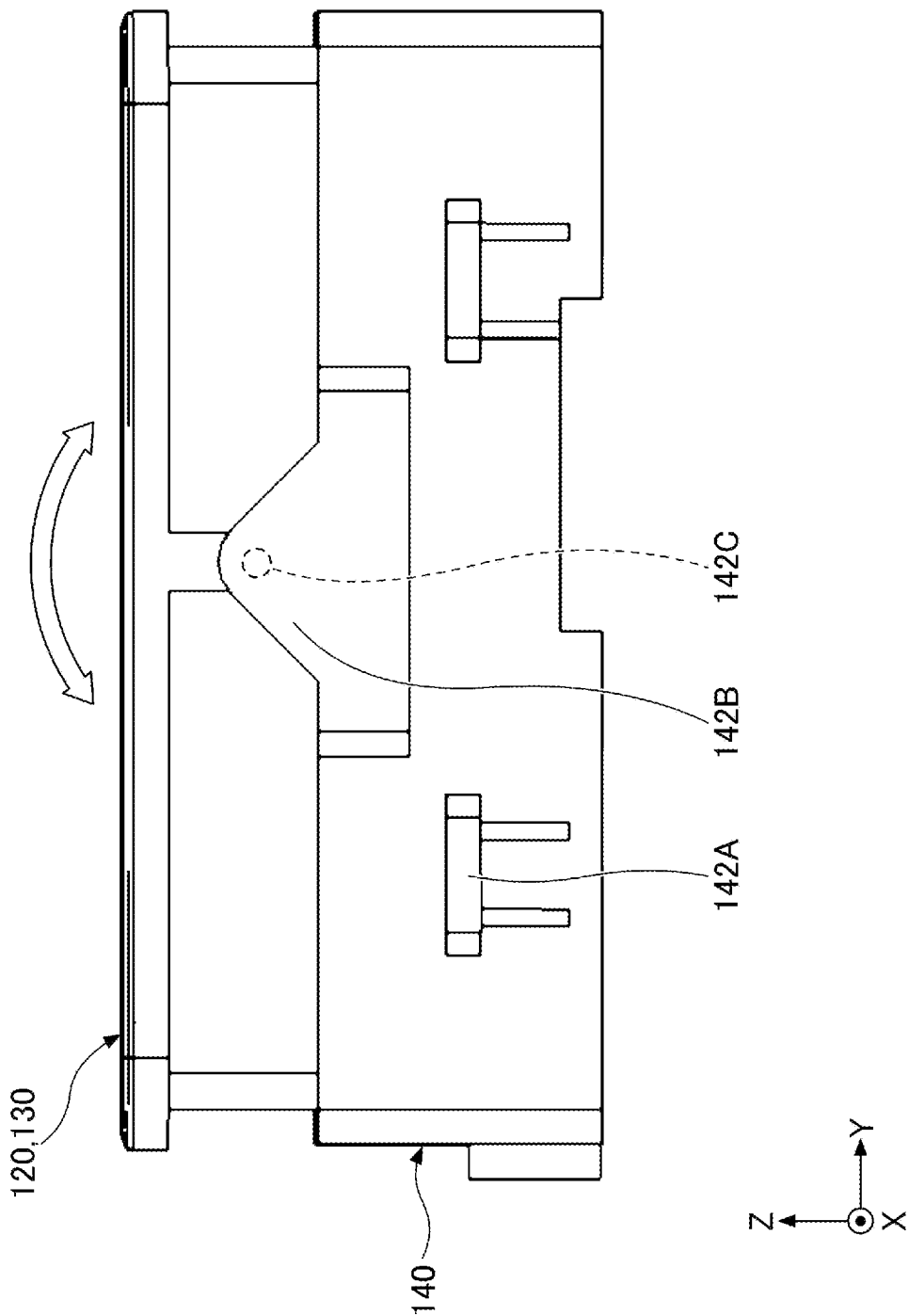

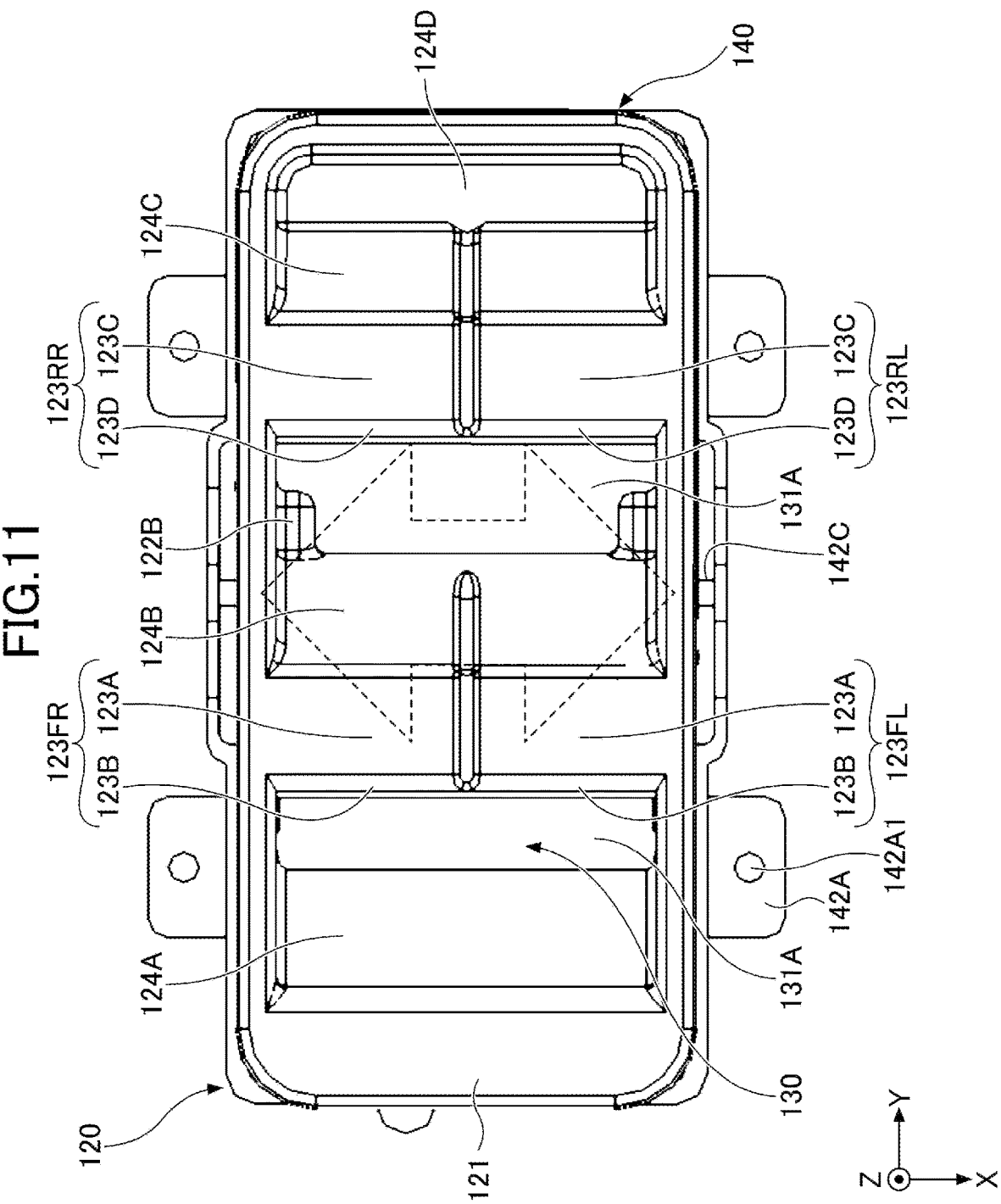

INPUT DEVICE

CROSS-REFERENCE TO RELATED APPLICATIONS

This application is a continuation application of International Application No. PCT/JP2021/040339, filed on Nov. 2, 2021, and designated the U.S., which is based upon and claims priority to Japanese Patent Application No. 2020-211595, filed on Dec. 21, 2020, the entire contents of which are incorporated herein by reference.

BACKGROUND

1. Field of the Invention

The present disclosure relates to an input device.

2. Description of the Related Art

Conventionally, a switch device including an operation switch, in which a plurality of switch knobs is formed integrally with a recessed portion into which a finger is inserted and a detector that detects a change (deflection) in a physical quantity due to an operation of the switch knob, is known. The plurality of switch knobs is used as switches for vehicle power windows. The switch knobs for the front seat windows and the switch knobs for the rear seat windows are different in shape (for example, see Patent Document 1).

RELATED-ART DOCUMENT

Patent Document

[Patent Document 1] Japanese Unexamined Patent Application Publication No. 2017-126505

Conventional switch devices have a different shape and flex differently from the switch knob (operation knob) for the front seat windows and the switch knob (operation knob) for the rear seat windows. For this reason, operability is different when operating the switch knob (operation knob) for the front seat windows and when operating the switch knob (operation knob) for the rear seat windows, and thus there are cases where operability may not be increased.

SUMMARY

An input device according to one embodiment of the present disclosure includes a base and an operation panel provided on the base and having a first recessed portion and a second recessed portion. The input device includes a shaft portion provided on the base or the operation panel and configured to swingably support the operation panel with respect to the base, and includes a first operation knob provided on a peripheral edge portion of the first recessed portion of the operation panel and having a first operation part and a second operation part, the first operation part being configured to swing the operation panel in a first swing direction by a pressing operation, and the second operation part being configured to swing the operation panel in a second swing direction opposite to the first swing direction by a pulling-up operation with a finger inserted into the first recessed portion. The input device includes a second operation knob provided on a peripheral edge portion of the second recessed portion of the operation panel and having a third operation part and a fourth operation part, the third operation part being configured to swing the operation panel in the second swing direction by a pressing operation, and the fourth operation part being configured to swing the operation panel in the first swing direction by a pulling-up operation with a finger inserted into the second recessed portion. The input device includes a swing detector configured to detect swing of the operation panel in the first swing direction with respect to the base by the pressing operation on the first operation part and the pulling-up operation on the fourth operation part, and swing of the operation panel in the second swing direction opposite to the first swing direction with respect to the base by the pulling-up operation on the second operation part and the pressing operation on the third operation part. The input device includes a first capacitance detection electrode provided in the first operation knob and configured to detect contact with the first operation part or the second operation part therein. The input device includes a second capacitance detection electrode provided in the second operation knob and configured to detect contact with the third operation part or the fourth operation part. The input device includes a control unit configured to discriminate between the pressing operation of the first operation part, the pulling-up operation of the fourth operation part, the pulling-up operation of the second operation part, and the pressing operation of the third operation part, based on output of the swing detector, output of the first capacitance detection electrode, and output of the second capacitance detection electrode.

BRIEF DESCRIPTION OF THE DRAWINGS

FIG. 10 is a diagram explaining operation of the input device 100.

FIG. 11 is a diagram explaining the operation of the input device 100.

DESCRIPTION OF THE EMBODIMENTS

Hereinafter, the input device of the present disclosure according to one embodiment will be described.

Embodiment

Figure 1:
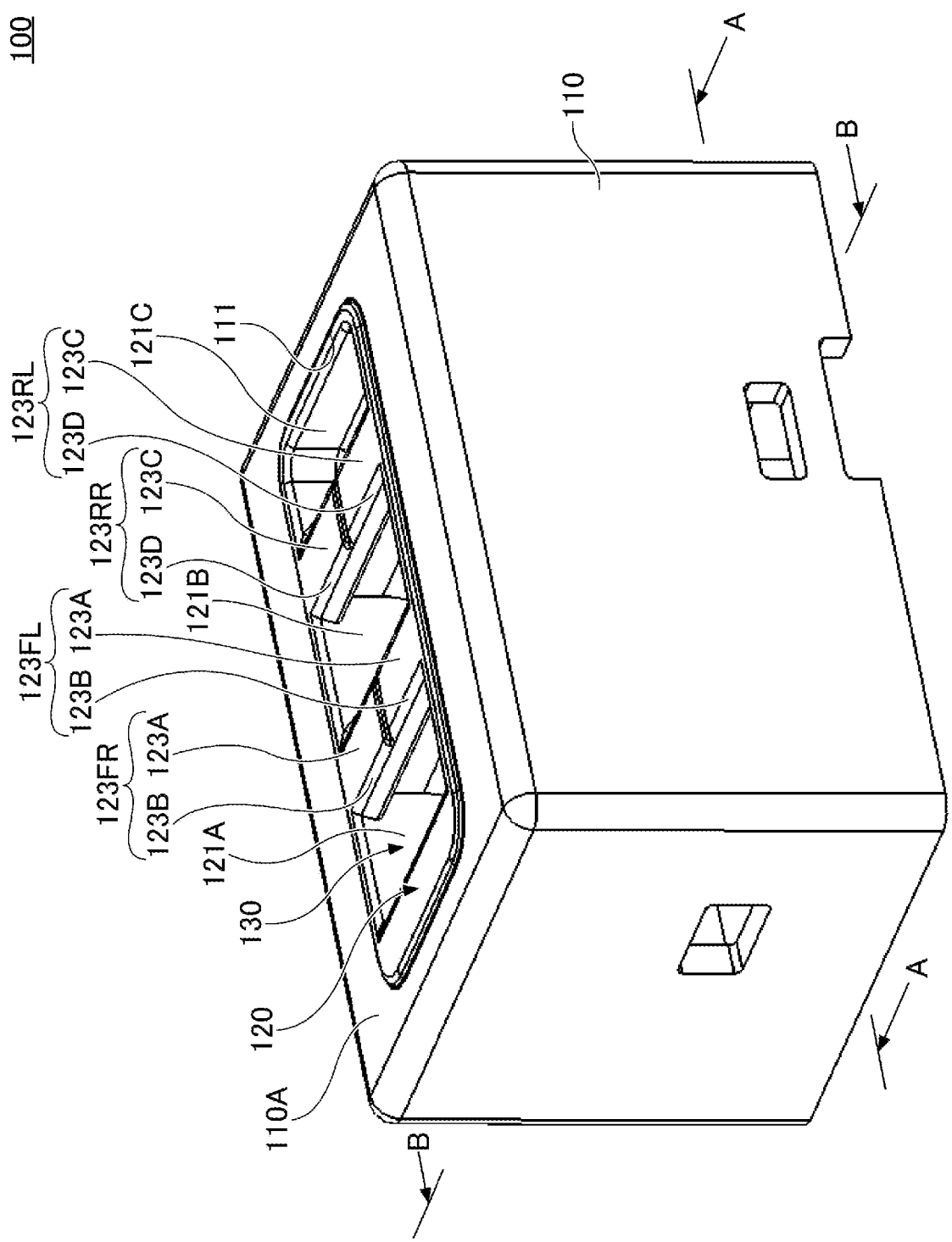
FIG. 1 is a perspective view showing an input device 100 according to an embodiment.
Figure 2:
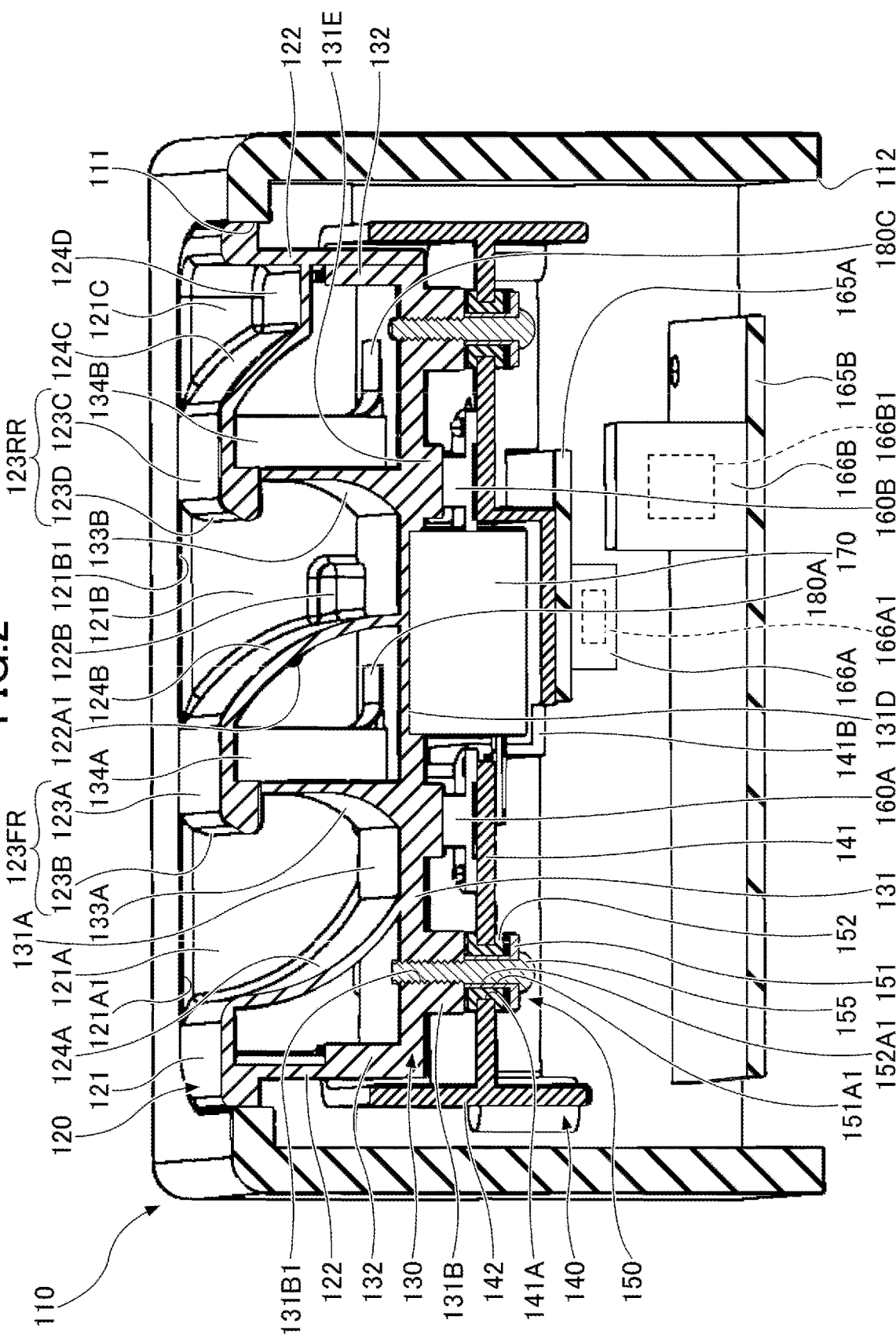
FIG. 2 is a cross-sectional view taken along line A-A in FIG. 1.

FIG. 1 is a perspective view showing an input device 100 according to one embodiment. FIG. 2 is a cross-sectional view taken along line A-A in FIG. 1. The cross section taken along line A-A is a cross section passing through the width center of the input device 100 in the X direction. The input device 100 includes a housing 110, an operation panel 120, a holder 130, a base 140, dampers 150, screws 155, and pressure sensors 160A and 160B. The input device 100 further includes substrates 165A and 165B, electronic components 166A and 166B, an actuator 170, first capacitance detection electrodes 180A and 180B, and second capacitance detection electrodes 180C and 180D. The pressure sensors 160A and 160B are examples of a first swing detector and a second swing detector, respectively. Here, although the operation panel 120 and the holder 130 are described as separate members, since the operation panel 120 and the holder 130 are fixed to each other and act as an integrated component, the operation panel 120 and the holder 130 may be integrally formed and treated as an operation panel.

Hereinafter, the embodiment of the present disclosure will be described in detail with defining an XYZ coordinate system. A plan view refers to an X-Y plane view, and for convenience, a −Z direction side is referred to as a lower side or below, and a +Z direction side is referred to as an upper side or above, but does not represent a general vertical relationship. The thickness is a dimension in the Z direction unless otherwise specified.

Figure 3:
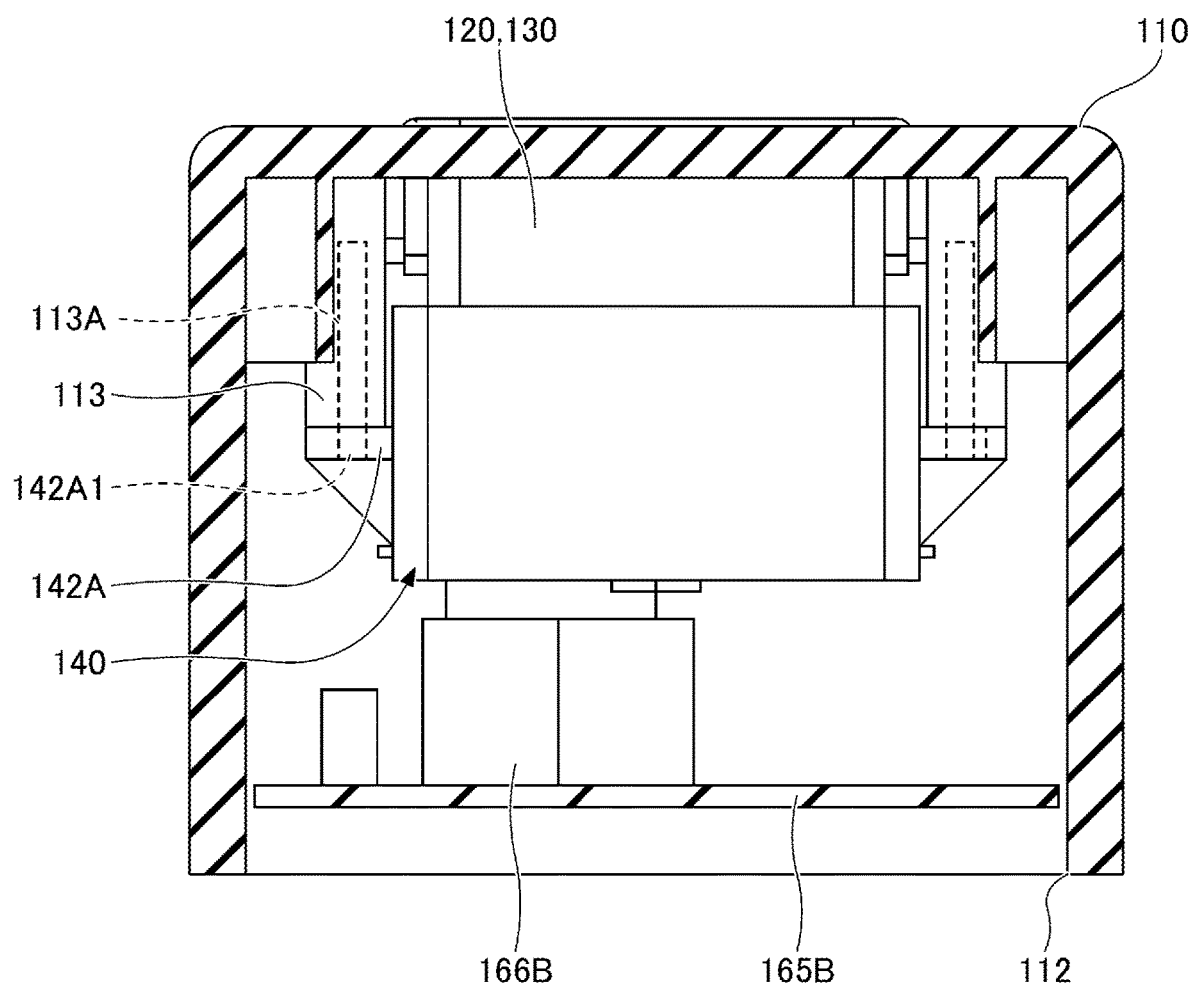
FIG. 3 is a cross-sectional view taken along line B-B in FIG. 1.
Figure 4:
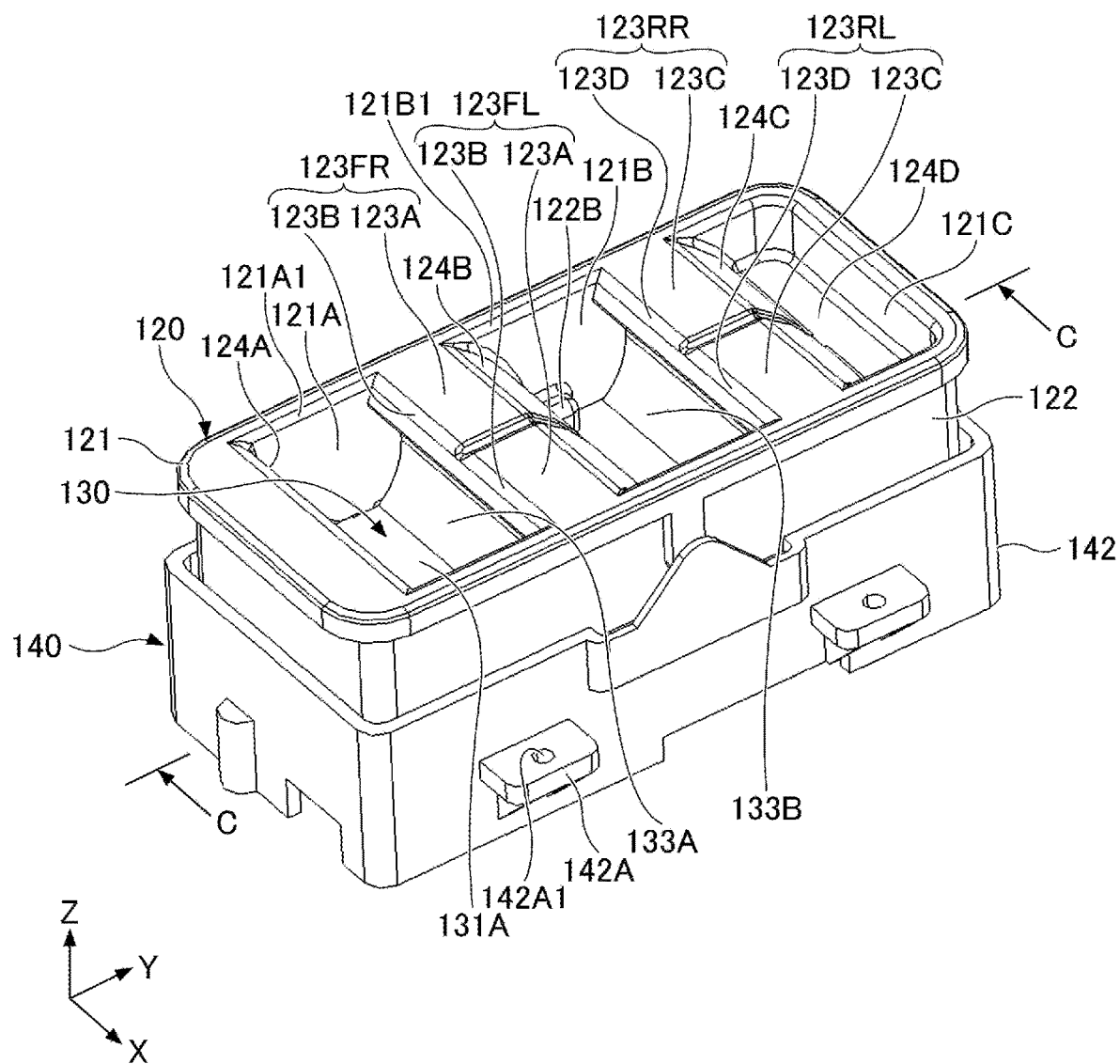
FIG. 4 is a perspective view showing an operation panel 120, a holder 130, and a base 140.
Figure 5:
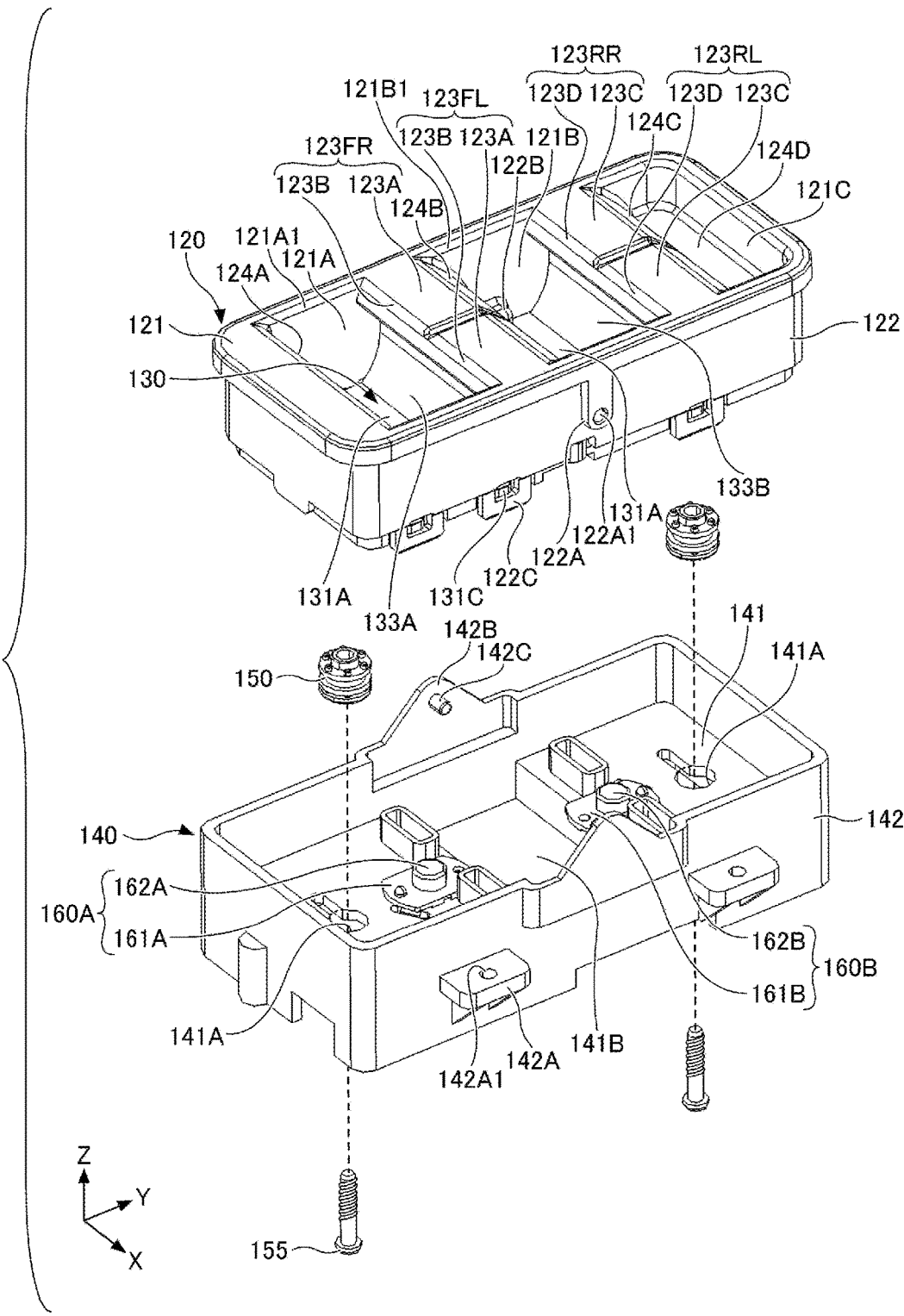
FIG. 5 is an exploded view showing the operation panel 120, the holder 130, the base 140, dampers 150, screws 155, and pressure sensors 160A and 160B.
Figure 6:
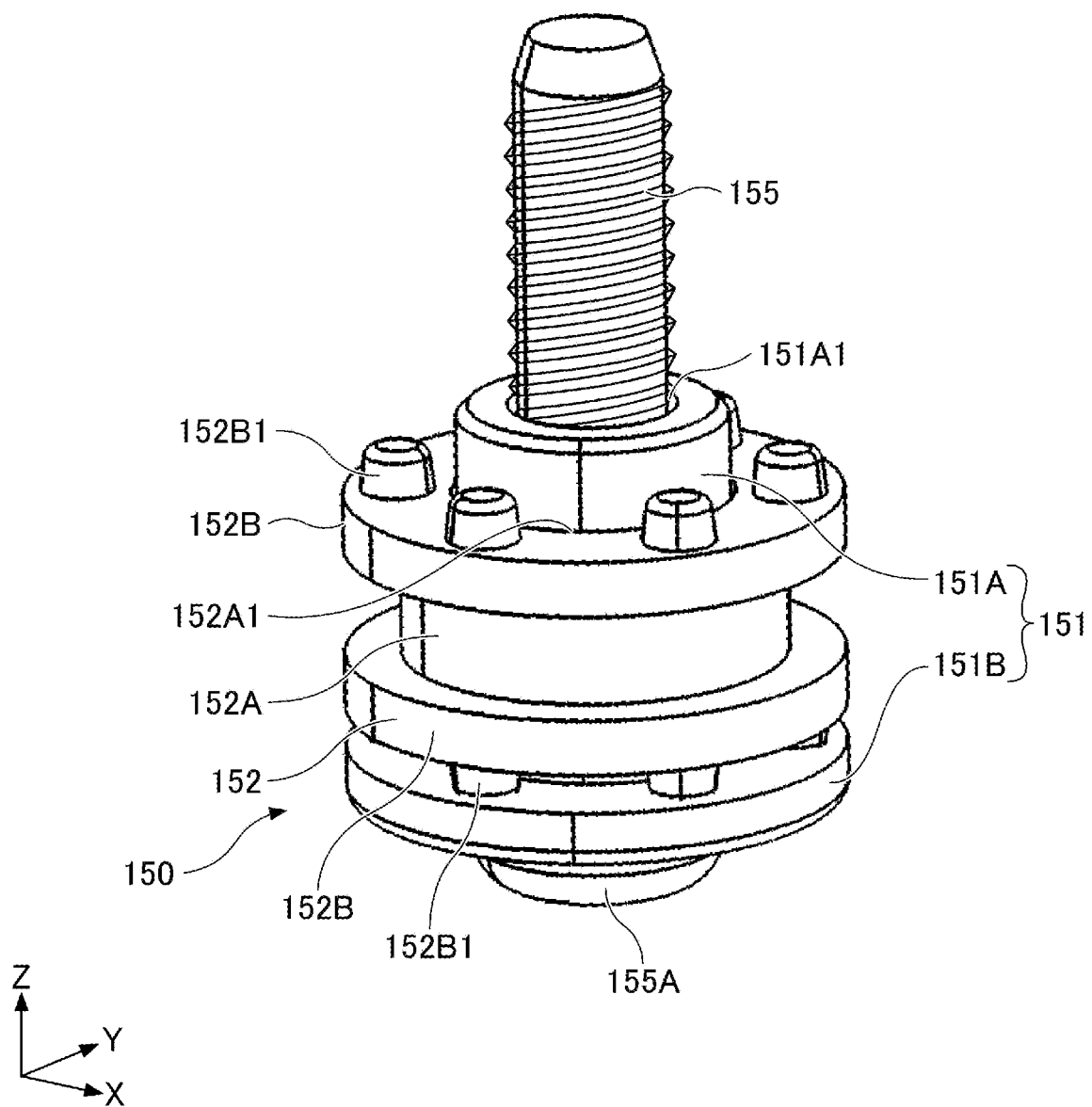
FIG. 6 is a view showing the damper 150 and the screw 155.
Figure 7:
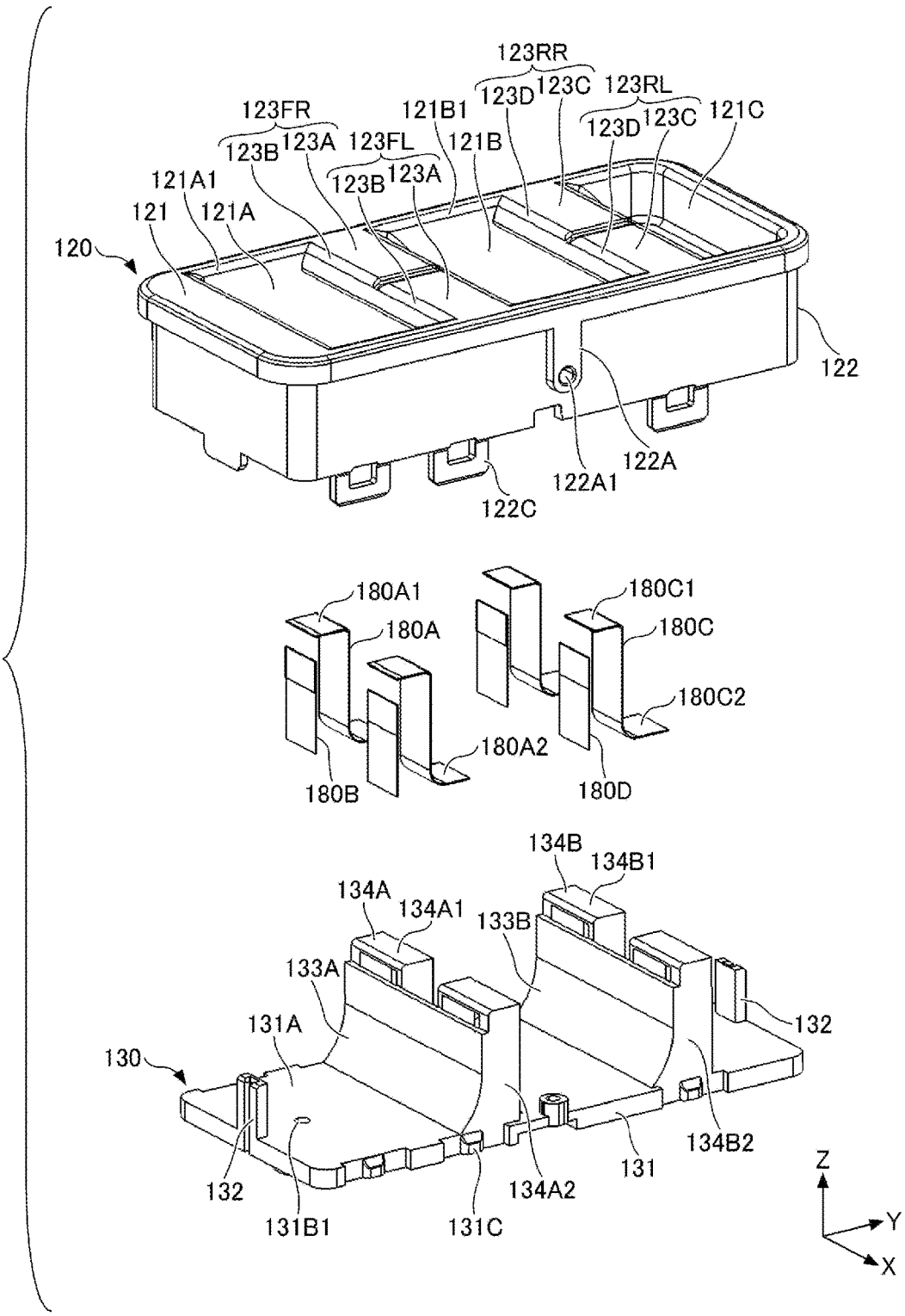
FIG. 7 is an exploded view illustrating the operation panel 120, the holder 130, first capacitance detection electrodes 180A and 180B, and second capacitance detection electrodes 180C and 180D.
Figure 8:
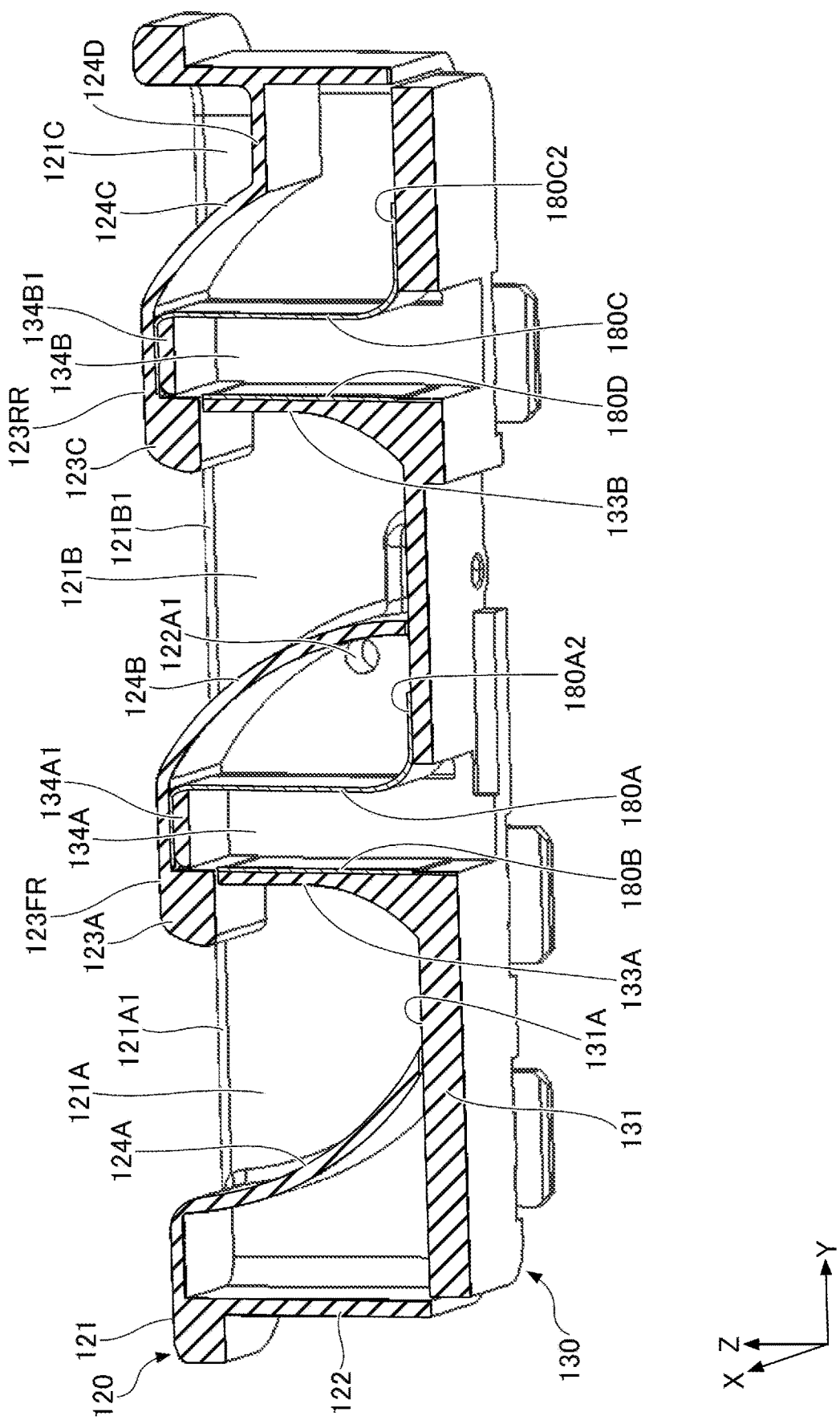
FIG. 8 is a diagram showing the operation panel 120, the holder 130, the first capacitance detection electrodes 180A and 180B, and the second capacitance detection electrodes 180C and 180D, and is a cross-sectional view taken along line C-C in FIG. 4.

Also, the embodiment of the present disclosure will be described in detail with reference to FIGS. 3 to 8, in addition to FIGS. 1 and 2. FIG. 3 is a cross-sectional view taken along line B-B in FIG. 1. FIG. 4 is a perspective view showing the operation panel 120, the holder 130, and the base 140. FIG. 5 is an exploded view showing the operation panel 120, the holder 130, the base 140, the dampers 150, the screws 155, and the pressure sensors 160A and 160B. FIG. 6 is a view showing the damper 150 and the screw 155. FIG. 7 is an exploded view illustrating the operation panel 120, the holder 130, the first capacitance detection electrodes 180A and 180B, and the second capacitance detection electrodes 180C and 180D. FIG. 8 is a diagram showing the operation panel 120, the holder 130, the first capacitance detection electrodes 180A and 180B, and the second capacitance detection electrodes 180C and 180D, and is a cross-sectional view taken along line C-C in FIG. 4.

The input device 100 is a device used as an operation switch of a power window of a vehicle, for example, and is assumed to be provided in a lining of a vehicle door, a center console, or the like, for example. Here, a vehicle having a total of four side windows that can be opened and closed arranged two on each of the right and left sides will be described. The input device 100 has the length in the Y direction longer than the length in the X direction in plan view. The longitudinal direction of the input device 100 is along the Y direction.

The housing 110 is a rectangular parallelepiped member made of resin as an example, and has an opening 111 provided on the upper surface thereof as shown in FIG. 1 and an opening 112 provided on the lower surface thereof as shown in FIGS. 2 and 3. The opening 111 is provided to expose the upper surface of the operation panel 120 to the upper surface of the housing 110. The opening 112 is entirely opened as if the entire lower surface of the housing 110 is penetrated. As shown in FIG. 3, the housing 110 includes mounting portions 113 provided therein. In the housing 110, the mounting portion 113 extends downward from the lower surface of a top plate 110A of the housing 110, and has a screw hole 113A formed upward from the lower end of the mounting portion 113. The housing 110 includes four mounting portions 113. Each of four mounting portions 142A of the base 140 is brought into contact with the lower end of the corresponding one of the mounting portions 113, and is fixed by a screw (not shown) passed through a screw hole 142A1 of the mounting portion 142A and the screw hole 113A of the mounting portions 113. As a result, the base 140 is fixed inside the housing 110 in a state of being suspended from the housing 110.

The housing 110 accommodates therein the operation panel 120, the holder 130, the base 140, the dampers 150, the screws 155, the pressure sensors 160A and 160B, the substrates 165A and 165B, the electronic components 166A and 166B, the actuator 170, the first capacitance detection electrodes 180A and 180B, and the second capacitance detection electrodes 180C and 180D. The upper surface of the operation panel 120 is exposed from the opening 111.

As shown in FIGS. 2 and 3, the operation panel 120 is fit with the housing 110 with the base 140 in a state in which, as shown in FIGS. 2 and 5, the operation panel 120 is combined with the holder 130 holding the first capacitance detection electrodes 180A and 180B and the second capacitance detection electrodes 180C and 180D (see FIG. 7). As shown in FIG. 4, the operation panel 120 is provided to overlap with the base 140.

As shown in FIGS. 1, 2, and 4, the operation panel 120 includes a frame portion 121, a side wall 122, first operation knobs 123FR and 123FL, second operation knobs 123RR and 123RL, inclined portions 124A, 124B, 124C, and a bottom portion 124D. The operation panel 20 may be made of an insulator, and is made of resin and integrally molded as an example here. The longitudinal direction of the operation panel 120 is along the Y direction.

As shown in FIG. 1, the frame portion 121 is a rectangular annular portion matching the opening shape of the opening 111 of the housing 110 in plan view. The operation panel 120 is vibrated by the actuator 170. A gap is provided between the frame portion 121 and the opening 111 so that vibration of the operation panel 120 is not transmitted to the housing 110.

As mainly shown in FIGS. 5 and 7, the frame portion 121 surrounds a first recessed portion 121A, a second recessed portion 121B, and a third recessed portion 121C provided inside the frame portion 121 in plan view, the first operation knobs 123FR and 123FL, the second operation knobs 123RR and 123RL, the inclined portions 124A, 124B, and 124C, and the bottom portion 124D in plan view.

Each of the first recessed portion 121A and the second recessed portion 121B has an opening size into which two fingertips of a user can be inserted in a state of being aligned in the X direction. The first recessed portion 121A is a portion into which a fingertip is inserted when the fingertip is put on the first operation knob 123FR or 123FL. The second recessed portion 121B is a portion into which a fingertip is inserted when the fingertip is put on the second operation knob 123RR or 123RL.

The first recessed portion 121A is a portion surrounded by the side wall 122 and the inclined portion 124A of the operation panel 120 and an upper surface 131A and an inclined portion 133A of the holder 130 when the operation panel 120 and the holder 130 are combined. The second recessed portion 121B is a portion surrounded by the side wall 122 and the inclined portion 124B of the operation panel 120 and the upper surface 131A and the inclined portion 133B of the holder 130 when the operation panel 120 and the holder 130 are combined.

Here, a mode in which the first recessed portion 121A is a recessed portion common to the first operation knobs 123FR and 123FL, and the second recessed portion 121B is a recessed portion common to the second operation knobs 123RR and 123RL will be described. However, the first recessed portion 121A may be divided into two portions in the X direction corresponding to the first operation knobs 123FR and 123FL, and the second recessed portion 121B may be divided into two portions in the X direction corresponding to the second operation knobs 123RR and 123RL. The third recessed portion 121C will be described later.

The side wall 122 extends downward from the lower surface of the frame portion 121, has a rectangular ring shape like the frame portion 121 in plan view, and is provided to be offset slightly inward from the frame portion 121. As shown in FIG. 7, the side wall 122 has a protruding portion 122A at the center in the Y direction of a portion extending in the Y direction on the +X direction side. The protruding portion 122A is a portion that protrudes further to the +X direction side than the side wall 122 and is flush with the side surface of the frame portion 121. The side wall 122 has a through hole 122A1 penetrating the side wall 122 in the X direction at the lower end of the protruding portion 122A. The side wall 122 also has another protruding portion 122A at the center in the Y direction of a portion extending in the Y direction on the −X direction side, and another through hole 122A1 penetrating the side wall 122 in the X direction is also provided in the protruding portion 122A on the −X direction side. Those two through holes 122A1 are located at the center of the operation panel 120 in the Y direction.

Further, the side wall 122 has protruding portions 122B as shown in FIG. 2. Each of the protruding portions 122B is a portion where the side wall 122 protrudes inward so as to be in contact with either one of the end portions on the +X direction side and on the −X direction side of the lower end of the inclined portion 124B. The protruding portion 122B is provided to improve the rigidity of the central portion of the operation panel 120 in the Y direction.

In addition, as illustrated in FIG. 7, the side wall 122 includes engagement portions 122C that protrude further downward from the lower end of the side wall, and that extend in the Y direction on the +X direction side. The engaging portion 122C is a frame-shaped spring, and is used to fix the operation panel 120 and the holder 130.

The first operation knobs 123FR and 123FL and the second operation knobs 123RR and 123RL are used to open and close four side windows of a vehicle including the front right (FR), the front left (FL), the rear right (RR), and the rear left (RL). It is assumed that the input device 100 is provided in the vehicle such that the −Y direction corresponds to the front of the vehicle, the −X direction corresponds to the right of the vehicle, the +X direction corresponds to the left of the vehicle, and the +Y direction corresponds to the rear of the vehicle. The first operation knobs 123FR and 123FL and the second operation knobs 123RR and 123RL are arranged in accordance with this positional relationship.

As mainly shown in FIGS. 2, 4, 5, 7, and 8, the first operation knobs 123FR and 123FL are provided on the peripheral edge portion of an opening 121A1 of the first recessed portion 121A, and share the first recessed portion 121A. The peripheral edge portion of the opening 121A1 is a portion of the circumference edge surrounding the opening 121A1. The second operation knobs 123RR and 123RL are provided on the peripheral edge portion of an opening 121B1 of the second recessed portion 121B, and share the second recessed portion 121B. The peripheral edge portion of the opening 121B1 is a portion of the circumference edge surrounding the opening 121B1. The openings 121A1 and 121B1 of the first recessed portion 121A and the second recessed portion 121B are openings through which the first recessed portion 121A and the second recessed portion 121B are exposed to the frame portion 121, and are entrances of the first recessed portion 121A and the second recessed portion 121B.

The first operation knobs 123FR and 123FL have the same configuration and share the first recessed portion 121A. As mainly shown in FIGS. 2, 4, 5, 7, and 8, the first operation knob 123FR includes a first operation part 123A and a second operation part 123B. The first operation part 123A of the first operation knob 123FR is provided adjacent to the +Y direction side of the second operation part 123B, and the second operation part 123B is provided between the first operation part 123A and the opening 121A1. Further, the first operation part 123A is provided above the inclined portion 133A and fixing portions 134A of the holder 130. In addition, at least a part of the first operation part 123A protrudes further to the −Y direction side than the inclined portion 133A of the holder 130. At least a part of the first operation part 123A also protrudes inward of the first recessed portion 121A in plan view. The first operation part 123A is a portion on which the pressing operation can be performed, and is a flat upper surface portion of the first operation knob 123FR. The front right side window can be lowered (opened) by pressing the first operation part 123A downward with a user's fingertip.

The second operation part 123B of the first operation knob 123FR is located further to the −Z direction than the first operation part 123A, and protrudes further to the −Y direction side than the inclined portion 133A of the holder 130. The second operation part 123B protrudes inward of the first recessed portion 121A in plan view. The second operation part 123B also includes a lower surface (a lower surface located on the −Z direction side and substantially parallel to the X-Y plane) of the first operation knob 123FR. Therefore, the first recessed portion 121A is present below the second operation part 123B. The second operation part 123B is a portion capable of performing an operation (pulling-up operation) of inserting a fingertip into the first recessed portion 121A to hook the finger pad and pull the portion up. The front right side window can be raised (closed) by inserting a user's fingertip into the first recessed portion 121A and pulling up the second operation part 123B.

As shown mainly in FIGS. 2, 4, 5, and 8, similarly to the first operation knob 123FR, the first operation knob 123FL includes another first operation part 123A and another second operation part 123B. The first operation part 123A and the second operation part 123B of the first operation knob 123FL have the same configurations as the first operation part 123A and the second operation part 123B of the first operation knob 123FR, respectively. Therefore, the front left side window can be lowered (opened) by pressing the first operation part 123A of the first operation knob 123FL downward with a user's fingertip. Further, the front left side window can be raised (closed) by inserting a user's fingertip into the first recessed portion 121A and pulling up the second operation part 123B.

The second operation knobs 123RR and 123RL have the same configuration and share the second recessed portion 121B. As mainly shown in FIGS. 2, 4, 5, 7, and 8, the second operation knob 123RR includes a third operation part 123C and a fourth operation part 123D. The third operation part 123C of the second operation knob 123RR is provided adjacent to the +Y direction side of the fourth operation part 123D, and the fourth operation part 123D is provided between the third operation part 123C and the opening 121B1. Further, the third operation part 123C is provided above the inclined portion 133B and fixing portions 134B of the holder 130. In addition, at least a part of the third operation part 123C protrudes further to the −Y direction side than the inclined portion 133B of the holder 130. At least a part of the third operation part 123C also protrudes inward of the second recessed portion 121B in plan view. The third operation part 123C is a portion on which the pressing operation can be performed, and is a flat upper surface portion of the second operation knob 123RR. The rear right side window can be lowered (opened) by pressing the third operation part 123C downward with a user's fingertip.

The fourth operation part 123D of the second operation knob 123RR is located further to the −Z direction than the third operation part 123C, and protrudes further to the −Y direction side than the inclined portion 133B of the holder 130. The fourth operation part 123D protrudes inward of the second recessed portion 121B in plan view. The fourth operation part 123D also includes a lower surface (a lower surface located on the −Z direction side and substantially parallel to the X-Y plane) of the second operation knob 123RR. Therefore, the second recessed portion 121B is present below the fourth operation part 123D. The fourth operation part 123D is a portion capable of performing an operation (pulling-up operation) of inserting a fingertip into the second recessed portion 121B to hook the finger pad and pull the portion up. The rear right side window can be raised (closed) by inserting a user's fingertip into the second recessed portion 121B and pulling up the fourth operation part 123D.

Similarly, to the second operation knob 123RR, the second operation knob 123RL includes another third operation part 123C and another fourth operation part 123D. The third operation part 123C and the fourth operation part 123D of the second operation knob 123RL have the same configurations as the third operation part 123C and the fourth operation part 123D of the second operation knob 123RR, respectively. Therefore, the rear left side window can be lowered (opened) by pressing the third operation part 123C of the second operation knob 123RL downward with a user's fingertip. Further, the rear left side window can be raised (closed) by inserting a user's fingertip into the second recessed portion 121B and pulling up the fourth operation part 123D.

The inclined portion 124A is located on the +Y direction side of the end portion on the −Y direction side of the frame portion 121, and extends while curving obliquely downward toward the inside of the first recessed portion 121A. In addition, the inclined portion 124B is located on the +Y direction side of the first operation knobs 123FR and 123FL, and extends while curving obliquely downward toward the inside of the second recessed portion 121B. The inclined portions 124A and 124B are provided between a portion on the +X direction side and a portion on the −X direction side of the frame portion 121 in the X direction. The inclined portions 124A and 124B are portions that become part of the inner walls of the first recessed portion 121A and the second recessed portion 121B, respectively.

The inclined portion 124A is curved so that a fingertip does not come into contact with the inner wall of the first recessed portion 121A when the fingertip is inserted into the first recessed portion 121A to hook on the second operation part 123B of the first operation knob 123FR or 123FL. The inclined portion 124B is curved so that the fingertip does not come into contact with the inner wall of the second recessed portion 121B when the fingertip is inserted into the second recessed portion 121B to hook on the fourth operation part 123D of the second operation knob 123RR or 123RL.

The third recessed portion 121C is a portion surrounded by the side wall 122, the inclined portion 124C, and the bottom portion 124D. The third recessed portion 121C, the inclined portion 124C, and the bottom portion 124D are provided to impart an appearance like that of the inclined portion 124B with respect to the first operation knobs 123FR and 123FL to the +Y direction side of the second operation knobs 123RR and 123RL.

As mainly shown in FIGS. 2, 7, and 8, the holder 130 includes a base portion 131, engaging portions 132, the inclined portions 133A and 133B, and the fixing portions 134A and 134B. The holder 130 holds the first capacitance detection electrodes 180A and 180B and the second capacitance detection electrodes 180C and 180D in a state of being fixed to the operation panel 120. The longitudinal direction of the holder 130 is along the Y direction.

The base portion 131 is a plate-shaped portion and includes the upper surface 131A, two convex portions 131B, six convex portions 131C, a recessed portion 131D, and two convex portions 131E. As shown in FIG. 2, the two convex portions 131B are provided at the widthwise center of the base portion 131 in the X direction, on each of the +Y direction side and the −Y direction side of the lower surface of the base portion 131, and protrude downward. The two convex portions 131B are located at the widthwise center of the base portion 131 in the X direction. A screw hole 131B1 is provided in the convex portion 131B. The screw hole 131B1 is a through hole through which a screw 155 for fixing the damper 150 is inserted, and penetrates the convex portion 131B and the base portion 131 in the Z direction.

As shown in FIG. 5, each of the convex portions 131C is a portion to be fitted into the corresponding one of the engaging portions 122C of the operation panel 120, and three convex portions are provided on the +X direction side and three convex portions are provided on the −X direction side. The engaging portions 132, the inclined portions 133A and 133B, and the fixing portions 134A and 134B are provided on the upper surface 131A of the base portion 131.

As shown in FIG. 2, the recessed portion 131D is a portion recessed upward from the lower surface of the base portion 131 in the central portion of the base portion 131 in the Y direction and in the central portion in the X direction. The actuator 170 is fixed to the recessed portion 131D. When the actuator 170 is driven, the holder 130 is excited.

As shown in FIG. 2, the two convex portions 131E are provided at the widthwise center of the base portion 131 in the X direction, on each of the +Y direction side and the −Y direction side of the lower surface of the base portion 131, and protrude downward. The two convex portions 131E are more centrally located in the Y direction than the two convex portions 131B. Each of the lower surfaces of the two convex portions 131E is in contact with the corresponding one of the upper surfaces of the two pressure sensors 160A and 160B. Each of the two convex portions 131E presses the corresponding one of the pressure sensors 160A and 160B.

Each of the engaging portions 132 extends upward from the corresponding one of the centers of the +Y direction side end and the −Y direction side end of the base portion 131 in the X direction. The two engaging portions 132 are portions used for positioning the holder 130 and the operation panel 120 to fix each other.

The inclined portion 133A is a portion of the inner surface of the first recessed portion 121A that is located below the first operation knobs 123FR and 123FL, in a state in which the holder 130 and the operation panel 120 are fixed to each other. In order to prevent a fingertip from coming into contact with the inclined portion 133A when the fingertip is hooked on one of the second operation parts 123B of the first operation knobs 123FR and 123FL, the inclined portion 133A is located further to the +Y direction side than the second operation part 123B.

The inclined portion 133B is a portion of the inner surface of the second recessed portion 121B that is located below the second operation knobs 123RR and 123RL, in a state in which the holder 130 and the operation panel 120 are fixed to each other. In order to prevent a fingertip from coming into contact with the inclined portion 133B when the fingertip is hooked on one of the fourth operation parts 123D of the second operation knobs 123RR and 123RL, the inclined portion 133B is located further to the +Y direction side than the fourth operation part 123D.

The fixing portions 134A and 134B are respectively provided on the +Y direction side of the inclined portions 133A and 133B, and formed integrally with the inclined portions 133A and 133B. Each of the two fixing portions 134A is located below the corresponding one of the first operation knobs 123FR and 123FL, and each of the two fixing portions 134B is located below the corresponding one of the second operation knobs 123RR and 123RL.

Each of the fixing portions 134A has an upper plate 134A1, and two wall portions 134A2 each of which extends from the end portion on the +X direction side of the upper plate 134A1 and from the end portion on the −X direction side thereof toward the upper surface 131A of the base portion 131 located below. The fixing portion 134A has a shape in which the upper ends of the two wall portions 134A2 are connected by the upper plate 134A1.

The fixing portion 134A fixes the first capacitance detection electrode 180B between the inclined portion 133A and the fixing portion. The first capacitance detection electrode 180B may be fixed to the holder 130 by being attached to the surface of the inclined portion 133A on the +Y direction side with an adhesive or the like. In addition, the first capacitance detection electrode 180A is disposed in a portion from the upper plate 134A1 to the upper surface 131A of the base portion 131 through the +Y direction sides of the wall portions 134A2. The first capacitance detection electrode 180A is bent in a crank shape in a Y-Z plane view, an upper end 180A1 thereof parallel to the X-Y plane is disposed on the upper plate 134A1, and a lower end 180A2 thereof parallel to the X-Y plane is disposed on the upper surface 131A of the base portion 131. When the holder 130 and the operation panel 120 are fixed in this state, each one of the upper ends 180A1 is sandwiched between the corresponding one of the lower surfaces of the first operation parts 123A of the first operation knobs 123FR and 123FL and the corresponding one of the upper plates 134A1 of the fixing portions 134A. Each one of the first capacitance detection electrodes may be fixed by being sandwiched between the corresponding one of the lower surfaces of the first operation parts 123A of the first operation knobs 123FR and 123FL and the corresponding one of the upper plates 134A1 of the fixing portions 134A. Further, the upper end 180A1 may be attached to the upper plate 134A1 with an adhesive or the like, and the lower end 180A2 may be attached to the upper surface 131A with an adhesive or the like to be fixed to the holder 130.

The fixing portion 134B has a configuration like that of the fixing portion 134A. Each of the fixing portions 134B has an upper plate 134B1, and two wall portions 134B2 each of which extends from the end portion on the +X direction side of the upper plate 134B1 and from the end portion on the −X direction side thereof toward the upper surface 131A of the base portion 131 located below. The fixing portion 134B has a shape in which the upper ends of the two wall portions 134B2 are connected by the upper plate 134B1.

The fixing portion 134B fixes the second capacitance detection electrode 180D between the inclined portion 133B and the fixing portion. The second capacitance detection electrode 180D may be fixed to the holder 130 by being attached to the surface of the inclined portion 133B on the +Y direction side with an adhesive or the like. In addition, the second capacitance detection electrode 180C is disposed in a portion from the upper plate 134B1 to the upper surface 131A of the base portion 131 through the +Y direction sides of the wall portions 134B2. The second capacitance detection electrode 180C is bent in a crank shape in a Y-Z plane view, an upper end 180C1 thereof parallel to the X-Y plane is disposed on the upper plate 134B1, and a lower end 180B2 thereof parallel to the X-Y plane is disposed on the upper surface 131A of the base portion 131. When the holder 130 and the operation panel 120 are fixed in this state, the upper ends 180C1 are sandwiched between the lower surfaces of the third operation parts 123C of the second operation knobs 123RR and 123RL and the upper plates 134B1 of the fixing portions 134B. The second capacitance detection electrodes 180C may be fixed by being sandwiched between the lower surfaces of the third operation parts 123C of the second operation knobs 123RR and 123RL and the upper plates 134B1 of the fixing portions 134B. Further, the upper end 180C1 may be attached to the upper plate 134B1 with an adhesive or the like, and the lower end 180C2 may be attached to the upper surface 131A with an adhesive or the like to be fixed to the holder 130.

As shown mainly in FIG. 5, the base 140 has a base portion 141 and a side wall 142. The longitudinal direction of the base 140 is along the Y direction. The base portion 141 is a plate-shaped portion and has two through holes 141A and a recessed portion 141B. The through hole 141A is provided on each of the +Y direction side and the −Y direction side of the base, and a rubber member 152 of the damper 150 is inserted therethrough. That is, the rubber members 152 are fixed to the base 140. Since a shaft portion 151 of the damper 150 is fixed to the holder 130 by the screw 155, the holder 130 is elastically attached to the base 140 via the rubber member 152.

The recessed portion 141B is a portion in which a central portion of the base portion 141 in the Y direction is recessed downward, and is provided to avoid the actuator 170 as illustrated in FIG. 2. That is, the base 140 is configured so as not to come into contact with the actuator 170 by the recessed portion 141B. In addition, the two pressure sensors 160A and 160B are fixed to each side of the recessed portion 141B in the Y direction on the upper surface of the base portion 141 and closer to the center in the Y direction than the two through holes 141A.

The side wall 142 surrounds the perimeter of the base 141 as shown in FIG. 5. The side wall 142 includes four mounting portions 142A, two convex portions 142B, and two shaft portions 142C. As shown in FIG. 5, two of the four mounting portions 142A are provided outside the side wall 142 on the +Y direction side, and the remaining two are provided outside the side walls 142 on the −Y direction side. As shown in FIG. 3, each one of the four mounting portions 142A is brought into contact with the corresponding one of the lower ends of the four mounting portions 113 of the housing 110, and is fixed by screws (not shown). As a result, the base 140 is fixed inside the housing 110 in a state of being suspended from the housing 110.

Each of the two convex portions 142B is provided on the +X direction side and the −X direction side of the side wall 142 as shown mainly in FIG. 5. The convex portion 142B on the −X direction side protrudes in the −X direction from a portion of the −X direction side of the side wall 142 that extends in the Y direction, and protrudes in the upper direction from the side wall 142. The convex portion 142B protrudes upward in a triangular shape in the Y-Z plane view. One of the shaft portions 142C that extends from the convex portion 142B in the +X direction is provided on the +X direction side of the top portion of the convex portion 142B.

The convex portion 142B on the +X direction side protrudes in the +X direction from a portion of the +X direction side of the side wall 142 that extends in the Y direction, and protrudes in the upper direction from the side wall 142. The convex portion 142B protrudes upward in a triangular shape in the Y-Z plane view. The other shaft portion 142C that extends from the convex portion 142B in the −X direction is provided on the −X direction side of the top portion of the convex portion 142B.

Each one of the two shaft portions 142C is inserted into the corresponding one of the through holes 122A1 of the operation panel 120. Since the protruding portion 122A in which the through hole 122A1 is provided protrudes outward from the side wall 142 of the operation panel 120 in the X direction, the convex portion 142B is offset outward from the side wall 122 in the X direction. The shaft portion 142C is inserted into the through hole 122A1, so that the operation panel 120 is swingable about the shaft portions 142C with respect to the base 140. The shaft portion 142C is an example of a shaft portion that swingably supports the operation panel 120 with respect to the base 140. Since the holder 130, the first capacitance detection electrodes 180A and 180B, and the second capacitance detection electrodes 180C and 180D are attached to the operation panel 120, the holder 130, the first capacitance detection electrodes 180A and 180B, and the second capacitance detection electrodes 180C and 180D are also swingable together with the operation panel 120 with respect to the base 140.

The operation panel 120 and the holder 130 are vibrated in the +X direction and −X direction by the actuator 170. Therefore, the two shaft portions 142C are inserted into the through holes 122A1 of the operation panel 120 so that the operation panel 120 and the holder 130 can vibrate in the X direction with respect to the base 140.

Each of the shaft portions 142C is provided between the first operation knobs 123FR and 123FL and the second operation knobs 123RR and 123RL in plan view, and extends in a direction perpendicularly intersecting (X-direction) a direction connecting the first operation knobs 123FR and 123FL and the second operation knobs 123RR and 123RL (Y-direction). Note that the shaft portion 142C does not need to extend strictly in the direction perpendicularly intersecting (X direction) the direction connecting the second operation knobs 123RR and 123RL (Y direction). The shaft portion 142C may extend in a direction perpendicularly intersecting (direction having an angle with respect to the X-axis in plan view) a direction connecting the second operation knobs 123RR and 123RL (Y-direction). For example, it may extend in a direction having an angle with respect to the X-axis in plan view, due to a manufacturing error. There may be a case where the shaft portion 142C extends in a direction having an angle with respect to the X-axis in plan view.

As shown in FIGS. 2 and 5, each of the through holes 122A1 through which the corresponding one of the shaft portions 142C is inserted is located between the first operation knobs 123FR and 123FL and the second operation knobs 123RR and 123RL in the Y direction. As a result, the operation panel 120 is uniformly swingable in both cases where it is swung clockwise about the shaft portions 142C and where it is swung counterclockwise about the shaft portions 142C.

Since the shaft portion 142C is positioned between the first operation knobs 123FR and 123FL and the second operation knobs 123RR and 123RL in the Y direction, when one of the first operation parts 123A of the first operation knobs 123FR and 123FL is pressed downward, the operation panel 120 and the holder 130 slightly swing counterclockwise about the shaft portions 142C as the center of swing in a state where the −X direction side is viewed from the +X direction side in the Y-Z plane view. This is an operation for lowering (opening) the right and left (FR, FL) front seat side windows in the vehicle by performing the pressing operation on the first operation knobs 123FR and 123FL, respectively. The counterclockwise swing is an example of the swing in the first swing direction.

In addition, when a fingertip is hooked on one of the second operation parts 123B of the first operation knobs 123FR and 123FL and pulled up, the operation panel 120 and the holder 130 swing in a direction opposite to the first swing direction. To be specific, in a state where the −X direction side is viewed from the +X direction side in the Y-Z plane view, the operation panel 120 and the holder 130 slightly swing clockwise about the shaft portions 142C as swing centers. This is an operation for raising (closing) the right and left (FR, FL) front seat side windows in the vehicle by performing the pulling-up operation on the first operation knobs 123FR and 123FL. The clockwise swing is an example of the swing in the second swing direction.

That is, in a state where the −X direction side is viewed from the +X direction side in the Y-Z plane view, the first operation knobs 123FR and 123FL cause the operation panel 120 to swing counterclockwise (first swing direction) by the pressing operation, and cause the operation panel 120 to swing clockwise (second swing direction) by the pulling-up operation.

When one of the third operation parts 123C of the second operation knobs 123RR and 123RL is pressed downward, the operation panel 120 and the holder 130 slightly swing clockwise about the shaft portions 142C as the center of swing in a state where the −X direction side is viewed from the +X direction side in the Y-Z plane view. This is an operation for lowering (opening) the right and left (RR, RL) rear seat side windows in the vehicle by performing the pressing operation on the second operation knobs 123RR and 123RL, respectively. The clockwise swing is an example of the swing in the second swing direction.

In addition, when a fingertip is hooked on one of the fourth operation parts 123D of the second operation knobs 123RR and 123RL and pulled up, the operation panel 120 and the holder 130 slightly swing counterclockwise about the shaft portions 142C as swing centers. This is an operation for raising (closing) the right and left (RR, RL) rear seat side windows in the vehicle by performing the pulling-up operation on the second operation knobs 123RR and 123RL. The counterclockwise swing is an example of the swing in the first swing direction.

That is, in a state where the −X direction side is viewed from the +X direction side in the Y-Z plane view, the second operation knobs 123RR and 123RL cause the operation panel 120 to swing clockwise (second swing direction) by the pressing operation, and cause the operation panel 120 to swing counterclockwise (first swing direction) by the pulling-up operation.

Since the first operation knobs 123FR and 123FL for the front seat side windows are located at the same position in the Y direction, the distance from the first operation knob 123FR to one shaft portion 142C and the distance from the first operation knob 123FL to the other shaft portion 142C are substantially equal. Similarly, since the second operation knobs 123RR and 123RL for the rear seat side windows are located at the same position in the Y direction, the distance from the second operation knob 123RR to one shaft portion 142C and the distance from the second operation knob 123RL to the other shaft portion 142C are substantially equal.

Here, the shaft portions 142C are positioned between the first operation knobs 123FR and 123FL and the second operation knobs 123RR and 123RL in the Y direction. With such an arrangement, it is easy to equalize the operation loads for the first operation knobs 123FR and 123FL and the second operation knobs 123RR and 123RL as compared with a case where the operation knobs for the front seat side windows and the operation knobs for the rear seat side windows are arranged on the same side (for example, on the +Y direction side of the shaft portion) with respect to the shaft portions extending in the X direction. Even if the operation loads for the first operation knobs 123FR and 123FL and the second operation knobs 123RR and 123RL are not the same, if it is an imperceptible difference, then the input device 100 that gives a uniform operational impression when operating the first operation knobs 123FR and 123FL and when operating the second operation knobs 123RR and 123RL, and good operability for the first operation knobs 123FR and 123FL and the second operation knobs 123RR and 123RL can be provided.

In the input device 100 of the embodiment, in order to make the operation load for the first operation knobs 123FR and 123FL substantially equal to the operation load for the second operation knobs 123RR and 123RL, the distance from the through hole 122A1 through which the shaft portion 142C is inserted to the first operation knob 123FR and the distance to the first operation knob 123FL are substantially equal to the distance from the same through hole 122A1 to the second operation knob 123RR and the distance to the second operation knob 123RL, respectively. To be more specific, the distance from the through hole 122A1 to the first operation part 123A of the first operation knob 123FR and the distance to that of the first operation knob 123FL are substantially equal to the distance from the same through hole 122A1 to the third operation part 123C of the second operation knob 123RR and the distance to that of the second operation knob 123RL, respectively. This is for substantially equalizing the operation load at the time of the pressing operation. Similarly, the distance from the through hole 122A1 to the second operation part 123B of the first operation knob 123FR and the distance to that of the first operation knob 123FL are substantially equal to the distance from the same through hole 122A1 to the fourth operation part 123D of the second operation knob 123RR and the distance to that of the second operation knob 123RL, respectively. This is for substantially equalizing the operation load at the time of the pulling-up operation. These distances will be described later with reference to FIG. 9.

As mainly shown in FIG. 2, the two dampers 150 are provided on the −Y direction side and the +Y direction side between the holder 130 and the base 140. The damper 150 on the −Y direction side is provided on the side where the first operation knobs 123FR and 123FL are positioned with respect to the shaft portion 142C in plan view (on the −Y direction side with respect to the shaft portions 142C in plan view). The damper 150 on the +Y direction side is provided on the side where the first operation knobs 123FR and 123FL are positioned with respect to the shaft portion 142C in plan view (on the +Y direction side with respect to the shaft portions 142C in plan view).

As shown mainly in FIGS. 2 and 6, the damper 150 has the shaft portion 151 and the rubber member 152. The damper 150 is provided to reduce vibration transmitted to the base 140 and the housing 110 by damping vibration of the holder 130 and the operation panel 120 excited by the actuator 170. For example, when the actuator 170 is driven, the vibration is attenuated to such an extent that the vibration is not felt even if the base 140 and the housing 110 are touched.

As shown in FIG. 6, the shaft portion 151 has a cylindrical portion 151A and an annular portion 151B. The cylindrical portion 151A has a through hole 151A1 penetrating in the Z direction (see FIG. 2). The screw 155 is inserted into the through hole 151A1 from the lower side thereof. The annular portion 151B is an annular portion provided at the lower end of the cylindrical portion 151A, and protrudes radially outward from the cylindrical portion 151A. The annular portion 151B holds the lower end of the rubber member 152 provided around the cylindrical portion 151A. The shaft portion 151 is made of metal, for example, and can be made of aluminum.

The rubber member 152 is a member made of rubber and includes a cylindrical portion 152A and two annular portions 152B. The cylindrical portion 152A has a through hole 152A1 penetrating in the Z direction, and the two annular portions 152B are provided at the upper and lower end portions of the cylindrical portion 152A.

As shown in FIG. 2, the damper 150 is provided between the base 140 and the holder 130. Since the holder 130 is fixed to the operation panel 120, the damper 150 is provided between the base 140 and the operation panel 120. The rubber member 152 is provided between the convex portion 131B of the holder 130 and the base 140. The rubber member 152 is an example of an elastic member provided between the base 140 and the operation panel 120. Here, in the present embodiment, the rubber member 152 inserted into the through hole 141A provided on the −Y direction side of the base 140 is an example of a first elastic member, and the rubber member 152 inserted into the through hole 141A provided on the +Y direction side of the base 140 is an example of a second elastic member. Although, in the embodiment, the damper 150 including the rubber member 152 as an example of an elastic member is described, the entire damper 150 may be made of rubber and have elasticity.

The cylindrical portion 152A is inserted into the through hole 141A of the base 140. In this state, the upper annular portion 152B is positioned on the upper surface side of the base portion 141 of the base 140, and the lower annular portion 152B is positioned on the lower surface side of the base portion 141. The vertical distance between the upper and lower annular portions 152B is adjusted to the height of the base portion 141. Further, the opening size of the through hole 141A is matched with the outer diameter of the cylindrical portion 152A. Therefore, as shown in FIG. 2, the rubber member 152 is configured not to be displaced with respect to the base 140 in a state where the cylindrical portion 152A is accommodated in the through hole 141A. For example, the rubber member 152 may be inserted into the through hole 141A, then the shaft portion 151 may be inserted into the through hole 152A1.

The annular portion 152B is a portion that protrudes radially outward from the cylindrical portion 152A. The upper surface of the upper annular portion 152B and the lower surface of the lower annular portion 152B are provided with a plurality of projections 152B1 at equal intervals in the circumferential direction. The protrusion 152B1 on the upper surface abuts against the lower surface of the convex portion 131B of the holder 130. The protrusion 152B1 on the lower surface abuts against the upper surface of the annular portion 151B.

The damper 150 absorbs the vibration of the operation panel 120 and the holder 130 between the holder 130 and the base 140, thereby damping the vibration transmitted to the base 140 and the housing 110. At this time, the rubber member 152 functions as a spring, and if the spring constant thereof is small, the high frequency component of the vibration is not readily transmitted, so that the vibration amount to be transmitted is reduced.

The screw 155 is inserted into the through hole 151A1 of the shaft portion 151 of the damper 150 from the lower side and screwed into the screw hole 131B1 of the convex portion 131B of the holder 130. By adjusting the tightening degree of the screw 155, the positions of the holder 130 and the base 140 can be adjusted. At this time, the upper surfaces of the pressure sensors 160A and 160B are brought into contact with the lower surfaces of the convex portions 131E of the holder 130.

As shown in FIG. 5, the pressure sensor 160A is provided on the -Y direction side of the upper surface of the base portion 141 of the base 140, and includes a base portion 161A and a sensor portion 162A. The pressure sensor 160A is provided on the side where the first operation knobs 123FR and 123FL are located with respect to the shaft portions 142C in plan view (on the -Y direction side with respect to the shaft portions 142C in plan view).

As shown in FIG. 5, the pressure sensor 160B is provided on the +Y direction side of the upper surface of the base portion 141 of the base 140, and includes a base portion 161B and a sensor portion 162B. The pressure sensor 160B is provided on the side where the second operation knobs 123RR and 123RL are located with respect to the shaft portions 142C in plan view (on the +Y direction side with respect to the shaft portions 142C in plan view).

The base portions 161A and 161B are portions for attaching the pressure sensors 160A and 160B, respectively, to the base portion 141. The sensor portions 162A and 162B protrude upward from the base portions 161A and 161B, respectively, and detect pressures applied to the upper surfaces of the sensor portions. For example, a load sensor can be used as the pressure sensors 160A and 160B. Note that the distance from one of the shaft portions 142C to the pressure sensor 160A is substantially equal to the distance from the same shaft portion 142C to the pressure sensor 160B, which will be described in detail later with reference to FIG. 9.

As shown in FIG. 2, the upper surfaces of the sensor portions 162A and 162B are in contact with the lower surfaces of the convex portions 131E of the holder 130. As shown in FIG. 5, the pressure sensor 160A is provided on the -Y direction side of the shaft portions 142C in the Y direction, and the pressure sensor 160B is provided on the +Y direction side of the shaft portions 142C in the Y direction.

Therefore, when the pressing operation is performed on the first operation knobs 123FR and 123FL, the pressure sensor 160A is pressed, and the load applied to the pressure sensor 160B decreases. When the pulling-up operation is performed on the first operation knobs 123FR and 123FL, the pressure sensor 160B is pressed, and the load applied to the pressure sensor 160A decreases.

Also, when the pressing operation is performed on the second operation knobs 123RR and 123RL, the pressure sensor 160B is pressed, and the load applied to the pressure sensor 160A decreases. When the pulling-up operation is performed on the second operation knobs 123RR and 123RL, the pressure sensor 160A is pressed, and the load applied to the pressure sensor 160B decreases.

Therefore, the pressing operation of the first operation knobs 123FR and 123FL can be detected by the pressure sensor 160A, and the pulling-up operation of the first operation knobs 123FR and 123FL can be detected by the pressure sensor 160B.

The pressing operation of the second operation knob 123RR, 123RL may be detected by the pressure sensor 160B, and the pulling-up operation of the second operation knob 123RR, 123RL may be detected by the pressure sensor 160A.

In addition, for example, the degree of tightening of the screw 155 may be adjusted to be large so that pretension is applied to the pressure sensors 160A and 160B in a state where no operation is performed on the first operation knobs 123FR and 123FL and the second operation knobs 123RR and 123RL. To apply pretension means to keep the pressure sensors 160A and 160B under a certain amount of pressure in a state where no operation is performed on the first operation knobs 123FR and 123FL and the second operation knobs 123RR and 123RL.

With this configuration, the pressing operation on the first operation knob 123FR and 123FL can be detected by an increase in the force (load) applied to the pressure sensor 160A, and the pulling-up operation on the first operation knob 123FR and 123FL can be detected by a decrease in the force (load) applied to the pressure sensor 160A. Since the first operation knobs 123FR and 123FL are located on the -Y direction side of the shaft portions 142C, the pressing operation and the pulling-up operation are detected by the pressure sensor 160A.

Further, the pressing operation of the second operation knob 123RR and 123RL can be detected by the increase of the force (load) applied to the pressure sensor 160B, and the pulling-up operation of the second operation knob 123RR and 123RL can be detected by the decrease of the force (load) applied to the pressure sensor 160B. Since the second operation knobs 123RR and 123RL are located on the +Y direction side of the shaft portions 142C, the pressing operation and the pulling-up operation are detected by the pressure sensor 160B.

When the power windows are operated by the first operation knobs 123FR and 123FL and the second operation knobs 123RR and 123RL, there are a manual mode and an automatic mode. The manual mode is a mode in which the power window motor is driven while the first operation knob 123FR, 123FL or the second operation knob 123RR, 123RL is being pressed or pulled up, and the power window motor is stopped when the pressing or pulling-up operation is stopped. The operation load at the time of performing the pressing operation or the pulling-up operation in the manual mode is set to half of the operation load for performing the pressing operation or the pulling-up operation in the automatic mode, for example.

The automatic mode is a mode in which the power window motor is driven until the side window is fully opened or fully closed by one pressing operation or pulling-up operation. The operation load when performing the pressing operation or the pulling-up operation in the automatic mode is set to be twice the operation load for performing the pressing operation or the pulling-up operation in the manual mode, for example.

The manual mode and the automatic mode can be selected by adjusting the operation load when performing the pressing operation or the pulling-up operation on the first operation knob 123FR, 123FL and the second operation knob 123RR, 123RL.

As shown in FIG. 2, the substrate 165A is attached to the lower surface of the recessed portion 141B of the base 140. The electronic component 166A is mounted on the lower surface of the substrate 165A. The substrate 165B is provided below the substrate 165A. The substrate 165B is suspended from the base 140 by, for example, a fixture (not shown). The electronic component 166B is mounted on the upper surface of the substrate 165B.

The substrates 165A and 165B are, for example, circuit boards. The electronic components 166A and 166B include integrated circuit (IC) chips or the like and are capable of processing information. The electronic components 166A and 166B are connected to each other by a cable or the like (not shown) so that data transmission is possible.

The electronic component 166A is connected to the first operation parts 123A and the second operation parts 123B of the first operation knobs 123FR and 123FL and to the third operation parts 123C and the fourth operation parts 123D of the second operation knobs 123RR and 123RL via wires, and includes an operation detector 166A1. Based on the output of the first capacitance detection electrodes 180A and 180B and the second capacitance detection electrodes 180C and 180D, the operation detector 166A1 detects any operation that has been performed on the first operation parts 123A and the second operation parts 123B of the first operation knobs 123FR and 123FL and on the third operation parts 123C and the fourth operation parts 123D of the second operation knobs 123RR and 123RL The operation detector 166A1 transmits a signal representing the detected operation to the electronic component 166B.

The signal transmitted from the operation detector 166A1 to the electronic component 166B indicates which one of the first operation parts 123A and the second operation parts 123B of the first operation knobs 123FR and 123FL, and the third operation parts 123C and the fourth operation parts 123D of the second operation knobs 123RR and 123RL has been operated.

The electronic component 166B includes a control unit 166B1. The electronic component 166B is connected to the pressure sensors 160A and 160B, the electronic component 166A, the actuator 170, and a drive control unit that drives the power window motor. Based on the output of the pressure sensors 160A and 160B and the signal transmitted from the operation detector 166A1 of the electronic component 166A, the control unit 166B1 determines in which of the manual mode and the automatic mode the power window has been operated in which of the first operation parts 123A and the second operation parts 123B of the first operation knobs 123FR and 123FL and the third operation parts 123C and the fourth operation parts 123D of the second operation knobs 123RR and 123RL. The control unit 166B1 outputs a drive command to the drive control unit that drives the power window motor, and drives the actuator 170 with a drive signal indicating either the manual mode or the automatic mode.

The actuator 170 is attached to the recessed portion 131D of the holder 130, and is driven by the drive signal output from the control unit 166B1. When the actuator 170 is driven by the control unit 166B1, the actuator vibrates the holder 130 in the X direction which is the axial direction of the shaft portions 142C. When the pressing operation or the pulling-up operation in the manual mode is performed on any of the first operation knobs 123FR and 123FL and the second operation knobs 123RR and 123RL, the control unit 166B1 drives the actuator 170 with the drive signal for the manual mode to generate pulse vibration once to the knob to which the operation is performed among the first operation knobs 123FR and 123FL and the second operation knobs 123RR and 123RL. Further, when the pressing operation or the pulling-up operation in the automatic mode is performed on any of the first operation knobs 123FR and 123FL and the second operation knobs 123RR and 123RL, the control unit 166B1 drives the actuator 170 with the drive signal for the automatic mode to generate pulse vibration twice to the knob to which the operation is performed among the first operation knobs 123FR and 123FL and the second operation knobs 123RR and 123RL. Therefore, the user can determine which of the manual mode and the automatic mode has been accepted based on the number of times of the pulse vibration, to the fingertip, transmitted to the knob to which the operation was performed among the first operation knobs 123FR and 123FL and the second operation knobs 123RR and 123RL.

As shown in FIG. 7, the first capacitance detection electrode 180A is provided to each one of the first operation knobs 123FR and 123FL. The first capacitance detection electrode 180A may be a metal electrode, and is formed of copper foil, for example. The first capacitance detection electrode 180A is bent in a crank shape in a Y-Z plane view, and fixed to the holder 130 by adhesion or the like in a state where the upper end 180A1 is disposed on the upper plate 134A1 of the fixing portion 134A and the lower end 180A2 is disposed on the upper surface 131A of the base portion 131. The upper end 180A1 of the first capacitance detection electrode 180A is located directly below the corresponding one of the first operation parts 123A of the first operation knobs 123FR and 123FL. Therefore, when a fingertip touches one of the first operation parts 123A of the first operation knob 123FR and 123FL to perform the pressing operation, the capacitance changes. As described above, the first capacitance detection electrode 180A is provided to each of the first operation knobs 123FR and 123FL, and detects the capacitance of the first operation parts 123A of the first operation knobs 123FR and 123FL. When the capacitance of the first operation part 123A of the first operation knobs 123FR or 123FL becomes greater than or equal to a threshold value, the operation detector 166A1 detects which of the first operation parts 123A of the first operation knobs 123FR and 123FL is touched by the finger.

As shown in FIG. 7, the first capacitance detection electrode 180B is provided to each one of the first operation knobs 123FR and 123FL. The first capacitance detection electrode 180B may be a metal electrode, and is formed of copper foil, for example. The first capacitance detection electrode 180B is fixed to the holder 130 by adhesion or the like in a state of being disposed between the inclined portion 133A and the fixing portion 134A. When the operation panel 120 and the holder 130 are fixed to each other as shown in FIG. 4, the upper half (see FIG. 7) of the first capacitance detection electrode 180B is located on the back side (+Y direction side) of the inclined portion 133A located below the second operation part 123B of the corresponding one of the first operation knobs 123FR and 123FR. Therefore, when a fingertip touches one of the second operation parts 123B of the first operation knobs 123FR and 123FL to perform the pulling-up operation, the capacitance changes. As described above, the first capacitance detection electrode 180B is provided to each of the first operation knobs 123FR and 123FL, and detects the capacitance of the second operation parts 123B of the first operation knobs 123FR and 123FL. When the capacitance of the second operation part 123B of the first operation knobs 123FR or 123FL becomes greater than or equal to the threshold value, the operation detector 166A1 detects which of the second operation parts 123B of the first operation knobs 123FR and 123FL is touched by the finger.

As shown in FIG. 7, the second capacitance detection electrode 180C is provided to each one of the second operation knobs 123RR and 123RL. The second capacitance detection electrode 180C may be a metal electrode, and is formed of copper foil, for example. The second capacitance detection electrode 180C is bent in a crank shape in a Y-Z plane view, and fixed to the holder 130 by adhesion or the like in a state where the upper end 180C1 is disposed on the upper plate 134B1 of the fixing portion 134B and the lower end 180C2 is disposed on the upper surface 131A of the base portion 131. The upper end 180C1 of the second capacitance detection electrode 180C is located directly below the corresponding one of the third operation parts 123C of the second operation knobs 123RR and 123RL. Therefore, when a fingertip touches one of the third operation parts 123C of the second operation knob 123RR and 123RL to perform the pressing operation, the capacitance changes. As described above, the second capacitance detection electrode 180C is provided to each of the second operation knobs 123RR and 123RL, and detects the capacitance of the third operation parts 123C of the second operation knobs 123RR and 123RL. When the capacitance of the third operation part 123C of the second operation knobs 123RR or 123RL becomes greater than or equal to the threshold value, the operation detector 166A1 detects which of the third operation parts 123C of the second operation knobs 123RR and 123RL is touched by the finger.

As shown in FIG. 7, the second capacitance detection electrode 180D is provided to each one of the second operation knobs 123RR and 123RL. The second capacitance detection electrode 180D may be a metal electrode, and is formed of copper foil, for example. The second capacitance detection electrode 180D is fixed to the holder 130 by adhesion or the like in a state of being disposed between the inclined portion 133B and the fixing portion 134B. When the operation panel 120 and the holder 130 are fixed to each other as shown in FIG. 4, the upper half (see FIG. 7) of the second capacitance detection electrode 180D is located on the back side (+Y direction side) of the inclined portion 133B located below the fourth operation part 123D of the corresponding one of the second operation knobs 123RR and 123RL. Therefore, when a fingertip touches one the fourth operation parts 123D of the second operation knobs 123RR and 123RL to perform the pulling-up operation, the capacitance changes. As described above, the second capacitance detection electrode 180D is provided to each of the second operation knobs 123RR and 123RL, and detects the capacitance of the fourth operation parts 123D of the second operation knobs 123RR and 123RL. When the capacitance of the fourth operation part 123D of the second operation knobs 123RR or 123RL becomes greater than or equal to the threshold value, the operation detector 166A1 detects which of the fourth operation parts 123D of the second operation knobs 123RR and 123RL is touched by the finger.

Figure 9:
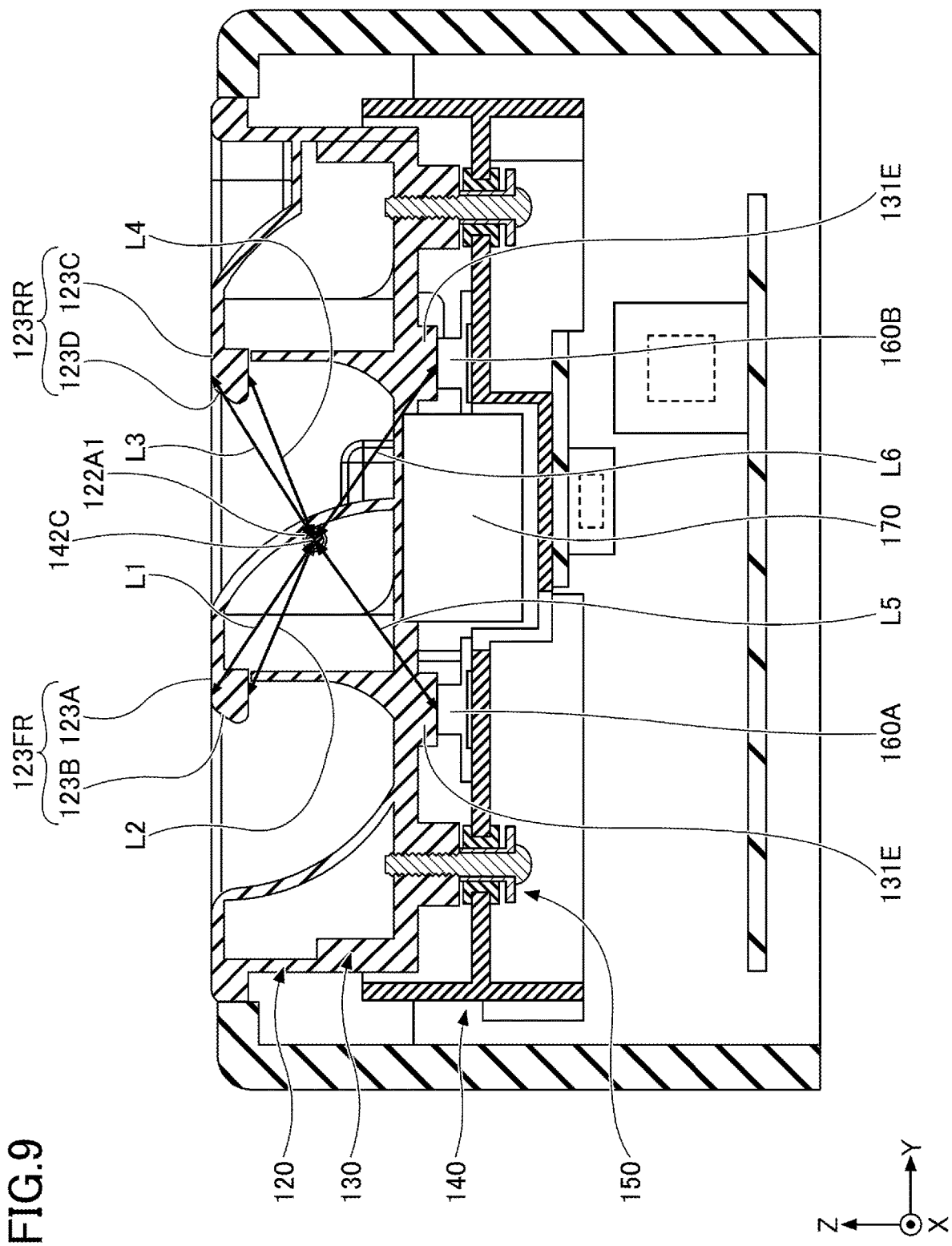
FIG. 9 is a diagram explaining a distance from a shaft portion 142C to some of the parts.

FIG. 9 is a diagram illustrating a distance from the shaft portion 142C. In FIG. 9, the shaft portion 142C is shown inside the through hole 122A1. Although the first operation knob 123FR and the second operation knob 123RR are used to describe here, since the operation panel 120, the holder 130, and the base 140 have a configuration in which the −X direction side and the +X direction side are symmetrical with respect to a straight line passing through the center of the widths in the X direction and parallel to the Y-axis, the same applies to the first operation knob 123FL and the second operation knob 123RL. Distances L1 to L6 described below are distances on a plane parallel to the Y-Z plane. In FIG. 9, only components related to the description are denoted by reference numerals.

In the input device 100 of the embodiment, the distance L1 from the shaft portion 142C to the first operation part 123A of the first operation knob 123FR and the distance L3 from the shaft portion 142C to the third operation part 123C of the second operation knob 123RR are substantially equal. In the present embodiment, the distance L1 is a distance between the end portion of the flat upper surface (first operation part 123A) of the first operation knob 123FR on the −Y direction side and the shaft portion 142C. In the present embodiment, the distance L3 is a distance between the end portion of the flat upper surface (third operation part 123C) of the second operation knob 123RR on the −Y direction side and the shaft portion 142C. By making the distances L1 and L3 substantially equal in this way, the operation load when the pressing operation is performed on the first operation knob 123FR and the operation load when the pressing operation is performed on the second operation knob 123RR become substantially equal. The same applies to the distance from the shaft portion 142C to the first operation part 123A of the first operation knob 123FL and the distance from the shaft portion 142C to the third operation part 123C of the second operation knob 123RL. The end portion of the first operation part 123A on the −Y direction side and the end portion of the third operation part 123C on the −Y direction side are set as the reference positions for the first operation part 123A side and the third operation part 123C side, respectively. Thereby, each of these positions is easy to recognize with a finger as a position to be operated when the pressing operation is performed since it is the boundary between the flat surface and the inclined surface, and it is easy to add pressure with the finger.

In addition, the distance L2 from the shaft portion 142C to the second operation part 123B of the first operation knob 123FR and the distance L4 from the shaft portion 142C to the fourth operation part 123D of the second operation knob 123RR are substantially equal. The distance L2 is a distance between the center of the flat lower surface constituting the lower portion of the second operation part 123B of the first operation knob 123FR in the Y direction and the shaft portion 142C. The distance L4 is a distance between the center of the flat lower surface constituting the lower portion of the fourth operation part 123D of the second operation knob 123RR in the Y direction and the shaft portion 142C. The center of the flat lower surface constituting the lower portion of the second operation part 123B in the Y direction and the center of the flat lower surface constituting the lower portion of the fourth operation part 123D in the Y direction are set as the reference positions of the second operation part 123B side and the fourth operation part 123D side, respectively. Thereby, each of these positions is easy to recognize with a finger as a position to be operated when the pulling-up operation is performed since there is a corner on the −Y direction side, and it is easy to add pressure with the finger. By making the distances L2 and L4 substantially equal in this way, the operation load when the pulling-up operation is performed on the first operation knob 123FR and the operation load when the pulling-up operation is performed on the second operation knob 123RR are substantially equal. The same applies to the distance from the shaft portion 142C to the second operation part 123B of the first operation knob 123FL and the distance from the shaft portion 142C to the fourth operation part 123D of the second operation knob 123RL.

Further, the distance L5 from the shaft portion 142C to the pressure sensor 160A and the distance L6 from the shaft portion 142C to the pressure sensor 160B are substantially equal. The distance L5 is a distance between the center of the upper surface of the pressure sensor 160A and the shaft portion 142C. The distance L6 is a distance between the center of the upper surface of the pressure sensor 160B and the shaft portion 142C. When the operation panel 120 swings, one of the pressure sensors 160A and 160B is pressed, and thus resistance is exerted when the pressing operation and the pulling-up operation are performed on the first operation knobs 123FR and 123FL and the second operation knobs 123RR and 123RL. For this reason, by making the distances L5 and L6 substantially equal, when viewing the −X direction side from the +X direction side in the Y-Z plane, the resistance when the operation panel 120 and the holder 130 swing clockwise with respect to the base 140 is made equal to the resistance when swinging counterclockwise, thereby improving the operability.

Further, since the pressure sensors 160A and 160B are pressed downward by the respective convex portions 131E of the holder 130 to detect the loads, by making the distances L5 and L6 from the shaft portion 142C substantially equal, the loads to be detected can be made substantially equal. If the pressure sensors 160A and 160B can detect the same pressing force as the same loads, the control unit 166B1 can use a common threshold value when discriminating between the manual mode and the automatic mode, thereby simplifying the control process.

FIGS. 10 and 11 are diagrams for explaining the operation of the input device 100. As shown in FIG. 10, the operation panel 120 and the holder 130 are swingable clockwise and counterclockwise with respect to the base 140 about the shaft portions 142C as swing shafts as indicated by a double-headed arrow. As shown in FIG. 11, when the actuator 170 (see FIG. 2) is driven, the operation panel 120 and the holder 130 can be vibrated in the X direction with respect to the base 140.

Figure 12A:
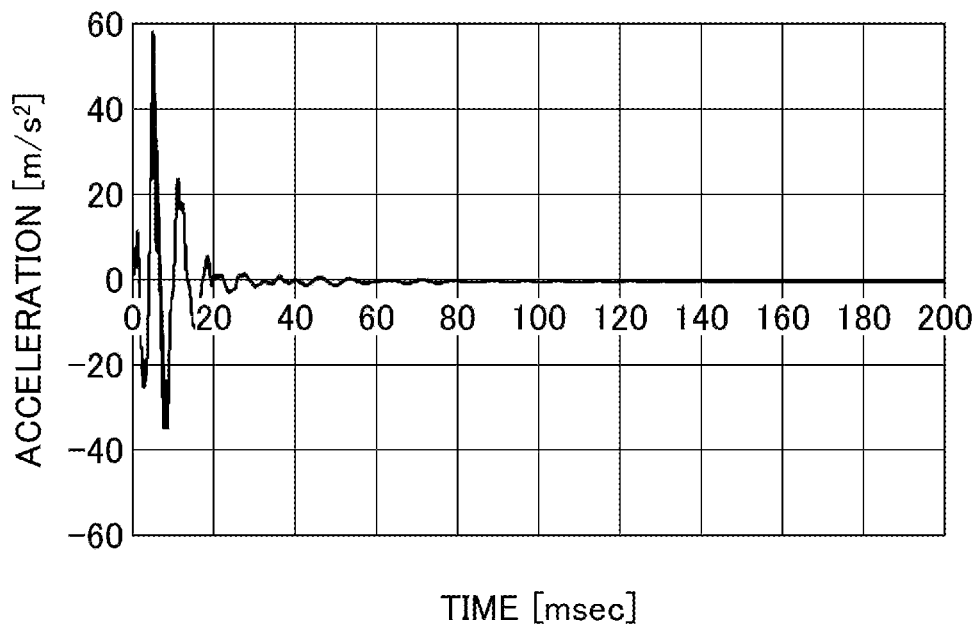
FIGS. 12A and 12B are diagrams showing a vibration waveform generated in the operation panel 120 when an actuator 170 is driven.
Figure 12B:
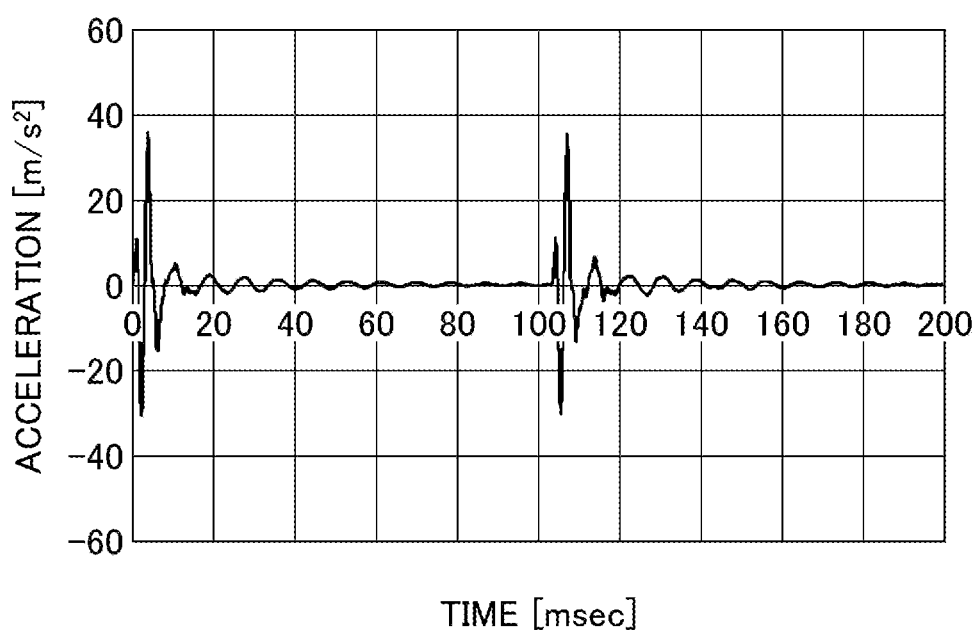

FIG. 12 are diagrams showing a vibration waveform generated in the operation panel 120 when the actuator 170 is driven. In FIGS. 12A and 12B, the horizontal axis represents time (msec) and the vertical axis represents acceleration (m/s$^2$).

FIG. 12A illustrates vibration of the operation panel 120 when driving of the actuator 170 is started by the drive signal for the manual mode at 0 msec. At about 5 msec, the pulse vibration occurs once. The vibration is dampened at about 20 msec and the maximum acceleration of about 9 G was obtained.

FIG. 12B shows the vibration of the operation panel 120 when the driving of the actuator 170 is started by the driving signal for the automatic mode at 0 msec. The pulse vibration occurs twice at about 5 msec and at about 105 msec. The vibration is dampened at about 15 msec and the maximum acceleration of about 5 G was obtained.

As described above, in the input device 100, the shaft portions 142C extending in the X direction are provided between the first operation knobs 123FR and 123FL disposed on the −Y direction side and the second operation knobs 123RR and 123RL disposed on the +Y direction side. In other words, in the input device 100, the first operation knobs 123FR and 123FL are provided on the −Y direction side with respect to the shaft portions 142C extending in the X direction, and the second operation knobs 123RR and 123RL are provided on the +Y direction side with respect to the shaft portions 142C extending in the X direction.

Therefore, when the pressing operation or the pulling-up operation is performed on the first operation knobs 123FR and 123FL and the second operation knobs 123RR and 123RL, the operation panel 120 and the holder 130 swing in the Y-Z plane with respect to the base 140 about the shaft portions 142C as the swing shafts. As described above, since the shaft portions 142C serving as the swing shafts are located between the first operation knobs 123FR and 123FL and the second operation knobs 123RR and 123RL, the arrangement is such that the operation load when the pressing operation and the pulling-up operation are performed on the first operation knobs 123FR and 123FL and the operation load when the pressing operation and the pulling-up operation are performed on the second operation knobs 123RR and 123RL can be easily equalized.

With such an arrangement, it is possible to make the operability when performing the pressing operation and the pulling-up operation on the first operation knobs 123FR and 123FL and the operability when performing the pressing operation and the pulling-up operation on the second operation knobs 123RR and 123RL close to each other. That is, the operation loads are substantially the same, when the pressing operation and the pulling-up operation are performed on any one of the first operation knobs 123FR and 123FL or the second operation knobs 123RR and 123RL.

Therefore, it is possible to provide the input device 100 with good operability by having uniform operational impression when each of the first operation knobs 123FR and 123FL and the second operation knobs 123RR and 123RL is operated. For example, in order to make the operation panel 120 and holder 130 swingable with respect to the base 140, the shaft portions 142C may be disposed on the −Y direction side of the first operation knobs 123FR and 123FL and the second operation knobs 123RR and 123RL. In addition, an arrangement in which the shaft portions 142C are provided on the +Y direction side of the first operation knobs 123FR and 123FL and the second operation knobs 123RR and 123RL is also conceivable. However, in these arrangements, unlike the input device 100 of the present embodiment, the operation load when the pressing operation and the pulling-up operation are performed on the first operation knobs 123FR and 123FL and the operation load when the pressing operation and the pulling-up operation are performed on the second operation knobs 123RR and 123RL cannot be set to equal or nearly equal values. Further, in these arrangements, the operation load of the operation knobs on the side close to the shaft portions 142C and the operation load of the operation knobs on the side far from the shaft portions 142C are greatly different from each other, and the user feels uncomfortable at the time of operation.

On the other hand, in the input device 100 according to the present embodiment, since the shaft portions 142C serving as the swing shafts are located between the first operation knobs 123FR and 123FL and the second operation knobs 123RR and 123RL, it is possible to equalize the operation load at the time of performing the pressing operation and the pulling-up operation on the first operation knobs 123FR and 123FL and the operation load at the time of performing the pressing operation and the pulling-up operation on the second operation knobs 123RR and 123RL. For this reason, it is possible to suppress giving discomfort to the user at the time of operation.

When the −X direction side is viewed from the +X direction side in the Y-Z plane, the operation panel 120 and the holder 130 are swung counterclockwise with respect to the base 140 when the pressing operation is performed on the first operation knobs 123FR and 123FL, and swung clockwise when the pulling-up operation is performed thereon. The operation panel 120 and the holder 130 are swung clockwise with respect to the base 140 when the pressing operation is performed on the second operation knobs 123RR and 123RL, and swung counterclockwise when the pulling-up operation is performed thereon. For this reason, the operation load is equalized and it is possible to provide good operability when performing both the counterclockwise operation and the clockwise operation.

The distance L1 between the first operation part 123A of the first operation knob 123FR and the shaft portion 142C and the distance L3 between the third operation part 123C of the second operation knob 123RR and the same shaft portion 142C are substantially equal. Also, the distance L1 between the first operation part 123A of the first operation knob 123FL and the shaft portion 142C and the distance L3 between the third operation part 123C of the second operation knob 123RL and the shaft portion 142C are substantially equal. Therefore, the operation loads when the pressing operation is performed on the first operation parts 123A of the first operation knobs 123FR and 123FL can be made substantially equal to the operation load when the pressing operation is performed on the third operation parts 123C of the second operation knobs 123RR and 123RL, respectively. As a result, it is possible to provide the input device 100 with further better operability by equalizing the operation load when performing the pressing operation on the first operation knobs 123FR and 123FL and the second operation knobs 123RR and 123RL. That is, the operation loads are substantially the same when performing the pressing operation on any of the first operation knobs 123FR and 123FL and the second operation knobs 123RR and 123RL.

Further, the distance L2 between the second operation part 123B of the first operation knob 123FR and the shaft portion 142C and the distance L4 between the fourth operation part 123D of the second operation knob 123RR and the same shaft portion 142C are substantially equal. Also, the distance L2 between the second operation part 123B of the first operation knob 123FL and the shaft portion 142C and the distance L4 between the fourth operation part 123D of the second operation knob 123RL and the shaft portion 142C are substantially equal. Therefore, the operation loads when the pulling-up operation is performed on the second operation parts 123B of the first operation knobs 123FR and 123FL can be made substantially equal to the operation load when the pulling-up operation is performed on the fourth operation parts 123D of the second operation knobs 123RR or 123RL, respectively. As a result, it is possible to provide the input device 100 with further better operability by equalizing the operation load when performing the pulling-up operation on the first operation knobs 123FR and 123FL and the second operation knobs 123RR and 123RL. That is, the operation loads are substantially the same when performing the pulling-up operation on any of the first operation knobs 123FR and 123FL and the second operation knobs 123RR and 123RL.

Furthermore, the actuator 170 that vibrates the operation panel 120 and the holder 130 in the X direction with respect to the base 140 is further included. The control unit 166B1 drives the actuator 170 according to a determination result based on the output of the pressure sensors 160A and 160B, the output of the first capacitance detection electrodes 180A and 180B, and the output of the second capacitance detection electrodes 180C and 180D. As a result, it is possible to provide the user with feedback by vibration in accordance with the position at which the operation is performed on the first operation knobs 123FR and 123FL and the second operation knobs 123RR and 123RL and the force applied to the fingertip at the time of the pressing operation and the pulling-up operation.

Since the pressure sensor 160A is provided on the −Y direction side with respect to the shaft portions 142C and the pressure sensor 160B is provided on the +Y direction side with respect to the shaft portions 142C, it is possible to detect the load applied to the −Y direction side and the +Y direction side of the operation panel 120. When the pretension is applied, it is possible to detect the load applied to the −Y direction side and the +Y direction side of the operation panel 120 by one of the pressure sensors 160A and 160B. However, by providing the pressure sensors 160A and 160B, it is possible to more accurately detect the load. If there is no problem in detecting the load, the input device 100 may include only one of the pressure sensors 160A and 160B.

In addition, by using the pressure sensors 160A and 160B as the first swing detector and the second swing detector, it is possible to easily detect the swing amount of the operation panel 120 through the load. Instead of the pressure sensors 160A and 160B, a sensor that detects the displacement of the operation panel 120 based on a change in a physical quantity other than the load, such as an optical displacement sensor, may be used.

Further, the distance L5 between the pressure sensor 160A and the shaft portion 142C and the distance L6 between the pressure sensor 160B and the shaft portion 142C are substantially equal. Therefore, when the −X direction side is viewed from the +X direction side in the Y-Z plane, the resistance when the operation panel 120 and the holder 130 swing clockwise with respect to the base 140 is made equal to the resistance when swinging counterclockwise, so that the operability of the input device 100 can be improved.

The rubber member 152 is provided between the base 140, and the operation panel 120 and the holder 130. Therefore, the vibration of the operation panel 120 and the holder 130 can be absorbed between the base 140, and the operation panel 120 and the holder 130, and the vibration transmitted to the base 140 and the housing 110 can be damped.

Further, since the rubber member 152 is provided on the −Y direction side and the +Y direction side of the shaft portions 142C in the plan view, it is possible to absorb the vibration of the operation panel 120 and the holder 130 in a well-balanced manner between the base 140, and the operation panel 120 and the holder 130 on the −Y direction side and the +Y direction side of the shaft portions 142C. The vibration transmitted to the base 140 and the housing 110 can be damped in a well-balanced manner in the Y direction.

In the above description, the operation panel 120 includes the first operation knobs 123FR and 123FL for the right and left front seat side windows and the second operation knobs 123RR and 123RL for the right and left rear seat side windows. However, when one front side window and one rear side window are opened and closed by the power window motor, the input device 100 may be configured to include one first operation knob and one second operation knob.

In addition, although the mode in which the operation panel 120 has the through holes 122A1 and the base 140 has the two shaft portions 142C has been described above, the operation panel 120 may have shaft portions and the base 140 may have through holes that swingably support the shaft portions. In addition, instead of the two shaft portions 142C, one shaft portion obtained by connecting the two shaft portions 142C may be provided.

Although the input device according to one or more embodiments of the present disclosure has been described above, the present disclosure is not limited to the specifically disclosed embodiments, and various modifications and changes can be made without departing from the scope of the claims.

Operation impression for any operation knob is uniform, and thus an input device with good operability can be provided.

What is claimed is:

1. An input device comprising:
    a base;
    an operation panel provided on the base and having a first recessed portion and a second recessed portion;
    a shaft portion provided on the base or the operation panel and configured to swingably support the operation panel with respect to the base;
    a first operation knob provided on a peripheral edge portion of the first recessed portion of the operation panel and having a first operation part and a second operation part, the first operation part being configured to swing the operation panel in a first swing direction by a pressing operation, and the second operation part being configured to swing the operation panel in a second swing direction opposite to the first swing direction by a pulling-up operation with a finger inserted into the first recessed portion;
    a second operation knob provided on a peripheral edge portion of the second recessed portion of the operation panel and having a third operation part and a fourth operation part, the third operation part being configured to swing the operation panel in the second swing direction by a pressing operation, and the fourth operation part being configured to swing the operation panel in the first swing direction by a pulling-up operation with a finger inserted into the second recessed portion;
    a swing detector configured to detect swing of the operation panel in the first swing direction with respect to the base by the pressing operation on the first operation part and the pulling-up operation on the fourth operation part, and swing of the operation panel in the second swing direction opposite to the first swing direction with respect to the base by the pulling-up operation on the second operation part and the pressing operation on the third operation part;
    a first capacitance detection electrode provided in the first operation knob and configured to detect contact with the first operation part or the second operation part;
    a second capacitance detection electrode provided in the second operation knob and configured to detect contact with the third operation part or the fourth operation part; and
    a control unit configured to discriminate between the pressing operation of the first operation part, the pulling-up operation of the fourth operation part, the pulling-up operation of the second operation part, and the pressing operation of the third operation part, based on an output of the swing detector, an output of the first capacitance detection electrode, and an output of the second capacitance detection electrode.

2. The input device according to claim 1, wherein a distance between the first operation part and the shaft portion is equal to a distance between the third operation part and the shaft portion.

3. The input device according to claim 1, wherein a distance between the second operation part and the shaft portion is equal to a distance between the fourth operation part and the shaft portion.

4. The input device according to claim 1, further including an actuator configured to vibrate the operation panel with respect to the base in an axial direction of the shaft portion,
    wherein the control unit drives the actuator according to a determination result based on the output of the swing detector, the output of the first capacitance detection electrode, and the output of the second capacitance detection electrode.

5. The input device according to claim 1, wherein at least a part of the first operation knob and the second operation knob is protruded inwardly into the first recessed portion and the second recessed portion in plan view, respectively.

6. The input device according to claim 1, wherein the swing detector includes a first swing detector provided on a side where the first operation knob is positioned with respect to the shaft portion in plan view, and a second swing detector provided on a side where the second operation knob is positioned with respect to the shaft portion in plan view.

7. The input device according to claim 6, wherein a distance between the first swing detector and the shaft portion is equal to a distance between the second swing detector and the shaft portion.

8. The input device according to claim 6, wherein the first swing detector and the second swing detector are pressure sensors.

9. The input device according to claim 1, further including an elastic member provided between the base and the operation panel.

10. The input device according to claim 9, wherein the elastic member includes a first elastic member provided on a side where the first operation knob is positioned with respect to the shaft portion in plan view, and a second elastic member provided on a side where the second operation knob is positioned with respect to the shaft portion in plan view.

* * * * *